US011679781B2

(12) United States Patent
Kim et al.

(10) Patent No.: US 11,679,781 B2
(45) Date of Patent: Jun. 20, 2023

(54) PATH PROVIDING DEVICE AND PATH PROVIDING METHOD THEREOF

(71) Applicant: LG Electronics Inc., Seoul (KR)

(72) Inventors: Jihyun Kim, Seoul (KR); Sungmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 17/035,313

(22) Filed: Sep. 28, 2020

(65) Prior Publication Data

US 2021/0009158 A1    Jan. 14, 2021

Related U.S. Application Data

(63) Continuation of application No. PCT/KR2018/016566, filed on Dec. 24, 2018.

(51) Int. Cl.
*B60W 60/00* (2020.01)
*G01C 21/00* (2006.01)
*B60W 30/16* (2020.01)
*G01C 21/34* (2006.01)
*G01C 21/36* (2006.01)

(52) U.S. Cl.
CPC .......... *B60W 60/001* (2020.02); *B60W 30/16* (2013.01); *G01C 21/3407* (2013.01); *G01C 21/3691* (2013.01); *G01C 21/3889* (2020.08); *B60W 2554/4026* (2020.02); *B60W 2554/4029* (2020.02); *B60W 2554/802* (2020.02); *B60W 2554/804* (2020.02)

(58) Field of Classification Search
None
See application file for complete search history.

(56) References Cited

U.S. PATENT DOCUMENTS

| 10,345,822 B1* | 7/2019 | Parchami ............. G05D 1/0088 |
| 2015/0081202 A1 | 3/2015 | Levin |
| 2017/0032671 A1* | 2/2017 | Toyama .................. G06F 21/64 |

(Continued)

FOREIGN PATENT DOCUMENTS

| KR | 101362706 | 2/2014 |
| KR | 1020180000672 | 1/2018 |

(Continued)

OTHER PUBLICATIONS

Extended European Search Report in European Appln. No. 18944990.3, dated Sep. 1, 2022, 9 pages.

*Primary Examiner* — David P. Merlino
(74) *Attorney, Agent, or Firm* — Fish & Richardson P.C.

(57) ABSTRACT

A path providing device for providing a route to a vehicle includes a first communication module configured to receive a high-definition (HD) map information from an external server, a second communication module configured to receive external information generated by an external device located within a predetermined range from the vehicle, and a processor configured to generate forward path information for guiding the vehicle based on the HD map and provide the forward path information to at least one of electric components provided in the vehicle. The processor is configured to generate dynamic information related to an object to be sensed by the at least one of the electric components based on the external information and to match the dynamic information to the forward path information.

18 Claims, 15 Drawing Sheets

(56) References Cited

U.S. PATENT DOCUMENTS

| | | | |
|---|---|---|---|
| 2018/0188742 A1 | 7/2018 | Wheeler | |
| 2018/0247537 A1* | 8/2018 | Oh | B60W 30/095 |
| 2019/0171224 A1* | 6/2019 | Meysel | G01S 13/931 |
| 2019/0204076 A1* | 7/2019 | Nishi | G01B 21/04 |
| 2019/0382004 A1* | 12/2019 | Golov | B60W 60/001 |
| 2021/0309231 A1* | 10/2021 | Fujita | G01C 21/3841 |

FOREIGN PATENT DOCUMENTS

| | | |
|---|---|---|
| KR | 1020180067199 | 6/2018 |
| KR | 1020180099215 | 9/2018 |

* cited by examiner

FIG. 1
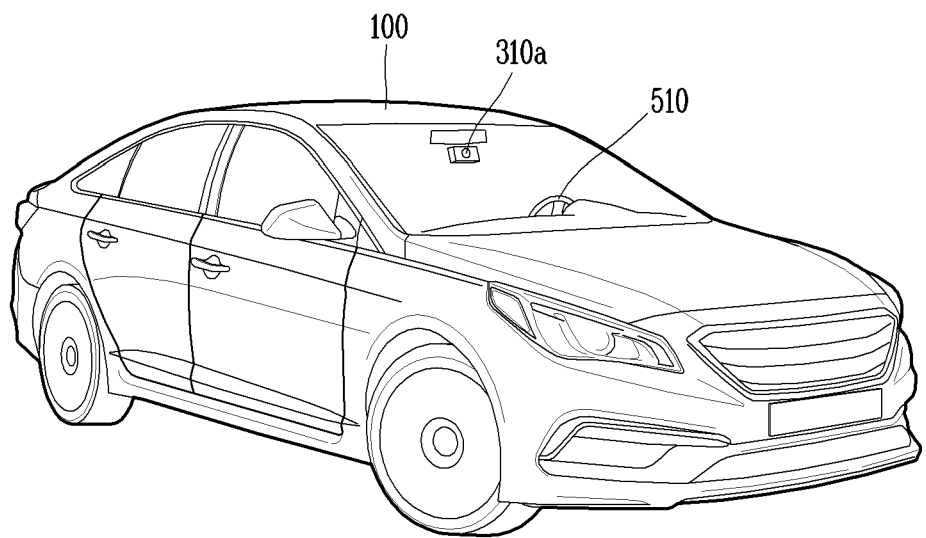
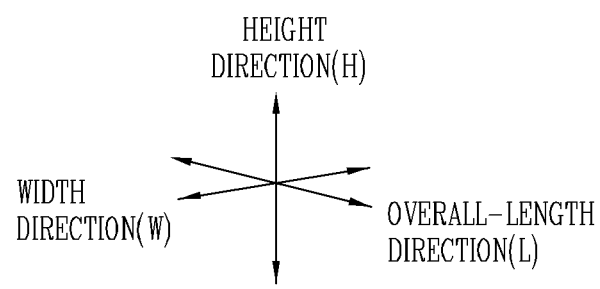

[ V2X-LDM ]

[ eHorizon-ADASIS ]

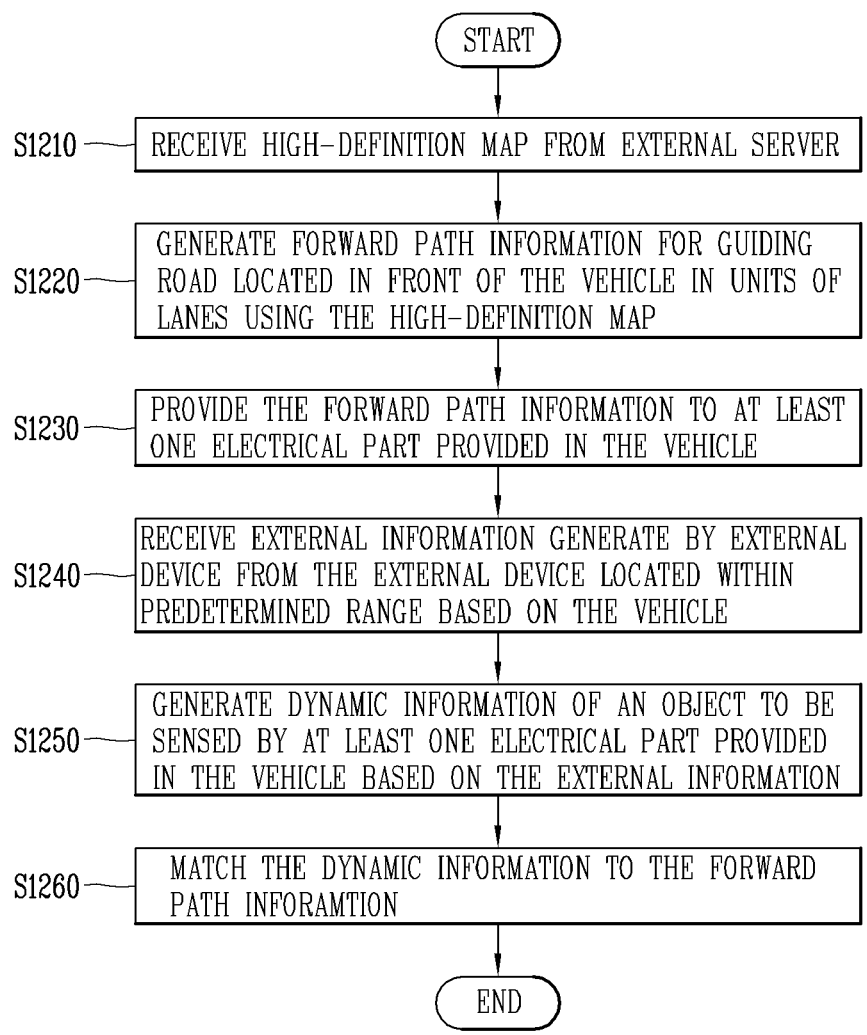

PATH PROVIDING DEVICE AND PATH PROVIDING METHOD THEREOF

CROSS-REFERENCE TO RELATED APPLICATION

This application is a continuation of International Application No. PCT/KR2018/016566, filed on Dec. 24, 2018, the disclosure of which is incorporated by reference in its entirety.

TECHNICAL FIELD

The present disclosure relates to a path providing device for providing a path to a vehicle and a path providing method thereof.

BACKGROUND

A vehicle may transport a user in a user-desired direction. A representative example of a vehicle may be an automobile.

In some examples, for convenience of a user using a vehicle, various types of sensors and electronic devices may be provided in the vehicle. For example, the vehicle may include, for the convenience of driving, advanced driver assistance system (ADAS). In some cases, the vehicle may be an autonomous vehicle.

The advanced driver assistance system (ADAS) may be improved for user's convenience and safety while driving a vehicle.

For example, in order to effectively transmit electronic Horizon (eHorizon) data to autonomous driving systems and infotainment systems, the European Union Original Equipment Manufacturing (EU OEM) Association has established a data specification and transmission method as a standard, namely "Advanced Driver Assistance Systems Interface Specification (ADASIS)."

In some cases, eHorizon software may be an integral part of safety/ECO/convenience of autonomous vehicles in a connected environment.

SUMMARY

The present disclosure describes a path providing device capable of allowing autonomous driving of a vehicle in an optimized manner, and a path providing method thereof.

The present disclosure also describes a path providing device capable of calculating a suitable travelling (or driving) route in lane units by taking a dynamic object into consideration, and a path providing method thereof.

According to one aspect of the subject matter described in this application, a path providing device is configured to provide a route to a vehicle. The device includes a first communication module configured to receive a high-definition (HD) map information from a server, a second communication module configured to receive external information generated by an external device located within a predetermined range from the vehicle, and a processor. The processor is configured to generate forward path information for guiding the vehicle to a road ahead of the vehicle based on the HD map information, provide the forward path information to at least one of electric components in the vehicle, generate dynamic information related to an object to be sensed by the at least one of the electric components based on the external information, and match the dynamic information to the forward path information.

Implementations according to this aspect may include one or more of the following features. For example, where the dynamic information includes first dynamic information and second dynamic information that is different from the first dynamic information, the processor may be configured to search for the external device located within the predetermined range, generate the first dynamic information based on a presence of the external device within the predetermined range, and generate the second dynamic information based on an absence of the external device within the predetermined range.

In some examples, the processor may be configured to, based on the external device being present within the predetermined range, generate the first dynamic information based on the external information received through the second communication module, and based on the external device not being present within the predetermined range, generate the second dynamic information based on the HD map information received through the first communication module. In some examples, the processor may be configured to, based on the external device being present within the predetermined range, control the first communication module to restrict transmission of the external information from the server through the first communication module.

In some implementations, the processor may be configured to, based on the external device corresponding to another vehicle, generate an autonomous driving command for maintaining a predetermined distance between the vehicle and the another vehicle. In some examples, the processor may be configured to determine whether the second dynamic information is generated according to at least one of a speed of the another vehicle, a relative speed of the vehicle with respect to the another vehicle, a distance from the another vehicle, a driving direction of the another vehicle, or a destination of the another vehicle.

In some implementations, the processor may be configured to generate the dynamic information based on the object being located within a reference range with respect to the vehicle, and restrict generation of the dynamic information based on the object being located out of the reference range. In some implementations, the processor may be configured to, determine a first communications service quality of the first communication module, and transmit a request for the HD map information to the external device through the second communication module based on the first communications service quality not satisfying a first condition.

In some examples, the processor may be configured to determine a second communications service quality of the second communication module, and control the first communication module to receive the external information from the server based on the second communications service quality not satisfying a second condition. In some examples, the processor may be configured to restrict access to the first communication module by the at least one of the electric components to thereby secure a bandwidth of the first communication module for receiving the external information from the server.

In some implementations, the processor may be configured to, based on receiving sensing information regarding the object from the at least one of the electric components, determine whether the sensing information and the dynamic information match each other, and delete the dynamic information from the forward path information based on a determination that the sensing information and the dynamic information do not match each other.

In some examples, the processor may be configured to, based on the determination that the sensing information and the dynamic information do not match each other, control the second communication module to restrict transmission of the external information from the external device. In some implementations, the processor may be configured to, based on the determination that the sensing information and the dynamic information do not match each other, control the first communication module to register the external device in the server.

According to another aspect, a path providing method for providing a route to a vehicle includes receiving a high-definition (HD) map information from a server, generating forward path information for guiding the vehicle to a road ahead of the vehicle based on the HD map information, providing the forward path information to at least one of electric components in the vehicle, receiving external information generated by an external device located within a predetermined range from the vehicle, generating dynamic information regarding an object to be sensed by the at least one of the electric components based on the external information, and matching the dynamic information to the forward path information.

Implementations according to this aspect may include one or more of the following features. For example, where the dynamic information may include first dynamic information and second dynamic information that is different from the first dynamic information, generating the dynamic information may include searching for the external device located within the predetermined range, generating the first dynamic information based on a presence of the external device within the predetermined range, and generating the second dynamic information based on an absence of the external device within the predetermined range.

In some implementations, generating the dynamic information may include, based on the external device being present within the predetermined range, generating the first dynamic information based on the external information, and based on the external device not being present within the predetermined range, generating the second dynamic information based on the HD map information.

In some implementations, the method may include, based on the external device corresponding to another vehicle, generating an autonomous driving command for maintaining a predetermined distance between the vehicle and the another vehicle. In some examples, generating the dynamic information may include generating the dynamic information based on the object being located within a reference range with respect to a traveling path of the vehicle, and restricting generation of the dynamic information based on the object being located out of the reference range.

In some implementations, the HD map information may be received through a first communication module, and the external information may be received through a second communication module. The method may further include determining a first communications service quality of the first communication module while receiving the HD map information through the first communication module, transmitting a request for the HD map information to the external device through the second communication module based on the first communications service quality not satisfying a first condition, determining a second communications service quality of the second communication module while receiving the external information through the second communication module, controlling the first communication module to receive the external information from the server based on the second communications service quality not satisfying a second condition, and restricting access to the first communication module by the at least one of the electric components to thereby secure a bandwidth of the first communication module for receiving the external information from the server.

In some implementations, the method may include, based on receiving sensing information regarding the object from the at least one of the electric components, determining whether the sensing information and the dynamic information match each other, and deleting the dynamic information from the forward path information based on a determination that the sensing information and the dynamic information do not match each other.

In some implementations, a suitable driving path (or route) may be provided in lane units by using a dynamic object sensed by a vehicle and a high-definition (HD) map received from an external server.

In some implementations, information regarding a suitable driving path determined using a dynamic object sensed from a vehicle and an HD map may be provided to a driver, or an interface for allowing autonomous driving of a vehicle in an optimized manner may be provided using the suitable driving path information.

In some implementations, the amount (or quantity) of information received through the first communication module and the amount of information received through the second communication module may be adjusted (or changed) for generating forward path information. Accordingly, resource usage may be minimized, and optimal forward path information may be offered by using information provided by different communication modules, which are complementary to each other.

The effects of the present disclosure are not limited to those effects mentioned above, and other effects not mentioned may be clearly understood by those skilled in the art from the description of the appended claims.

BRIEF DESCRIPTION OF THE DRAWINGS

FIG. 1 is a diagram illustrating an outer appearance of an example vehicle.

FIG. 12 is a flowchart illustrating an example of a path providing method of the path providing device of FIG. 9.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In this application, a suffix such as "module" and "unit" may be used to refer to elements, components, devices, hardware, or software.

A vehicle may include various types of automobiles such as cars, motorcycles, and the like. Hereinafter, the vehicle will be described based on a car.

The vehicle may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving (or traveling) direction of the vehicle, and a right side of the vehicle refers to a right side in the driving direction.

FIG. 1 is a diagram illustrating an outer appearance of an example vehicle.

Figure 2:
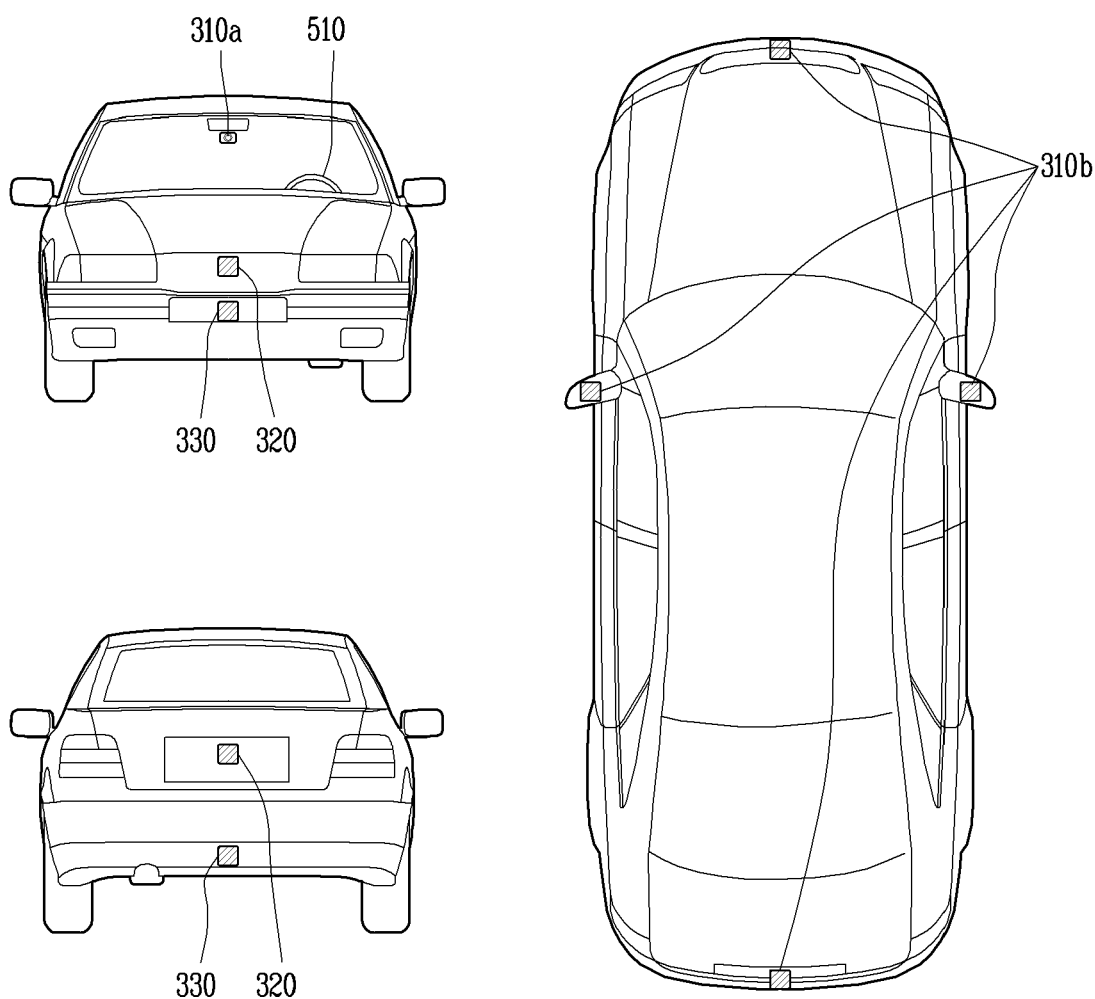
FIG. 2 is a diagram illustrating an outer appearance of the vehicle at various angles.

FIG. 2 is a diagram illustrating an outer appearance of the vehicle at various angles.

Figure 3:
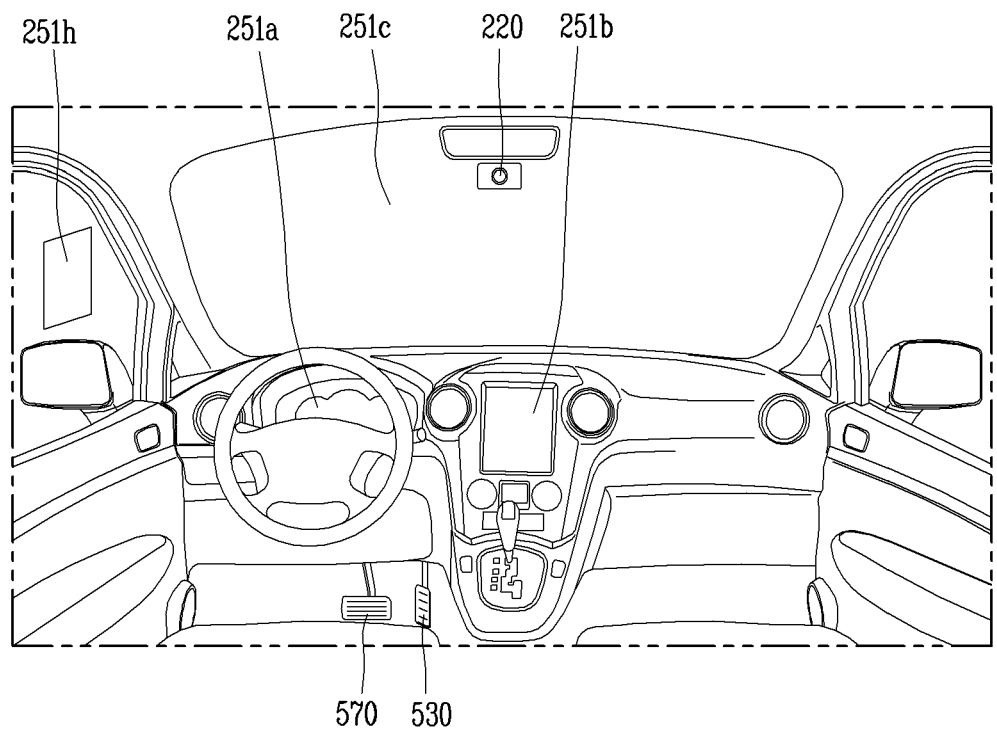
FIGS. 3 and 4 are diagrams illustrating examples of an inside of a vehicle.
Figure 4:
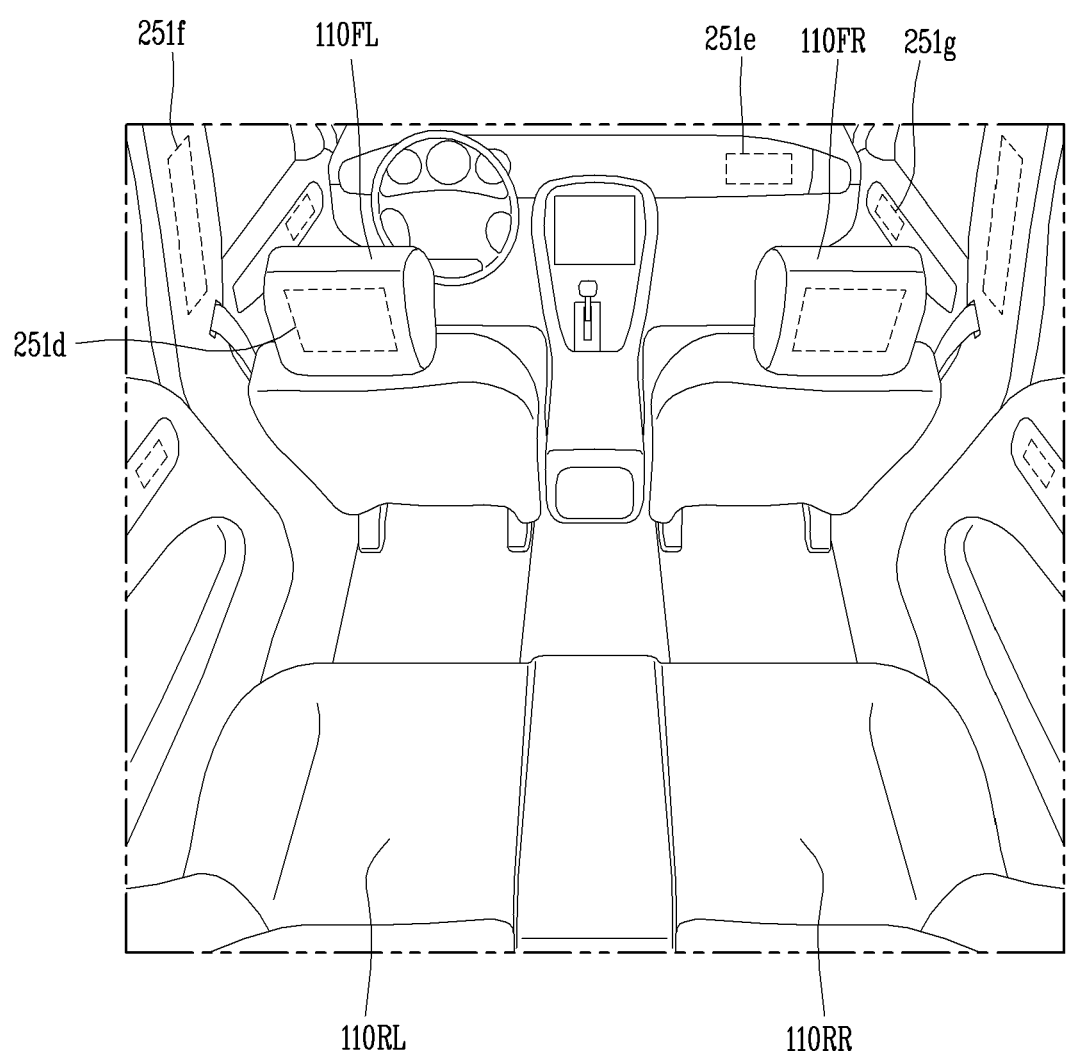

FIGS. 3 and 4 are diagrams illustrating examples of an inside of a vehicle.

Figure 5:
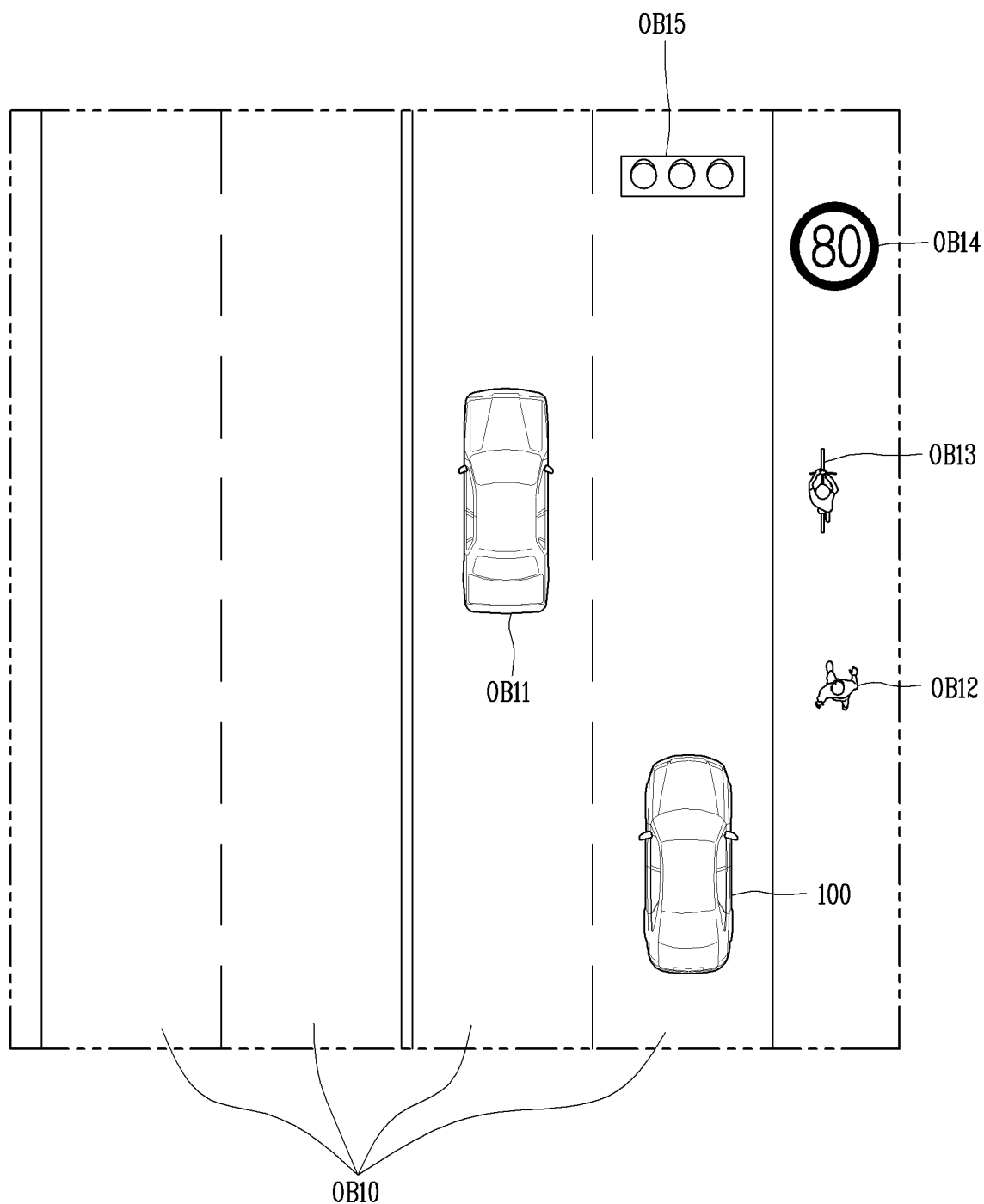
FIGS. 5 and 6 are diagrams illustrating example objects.
Figure 6:
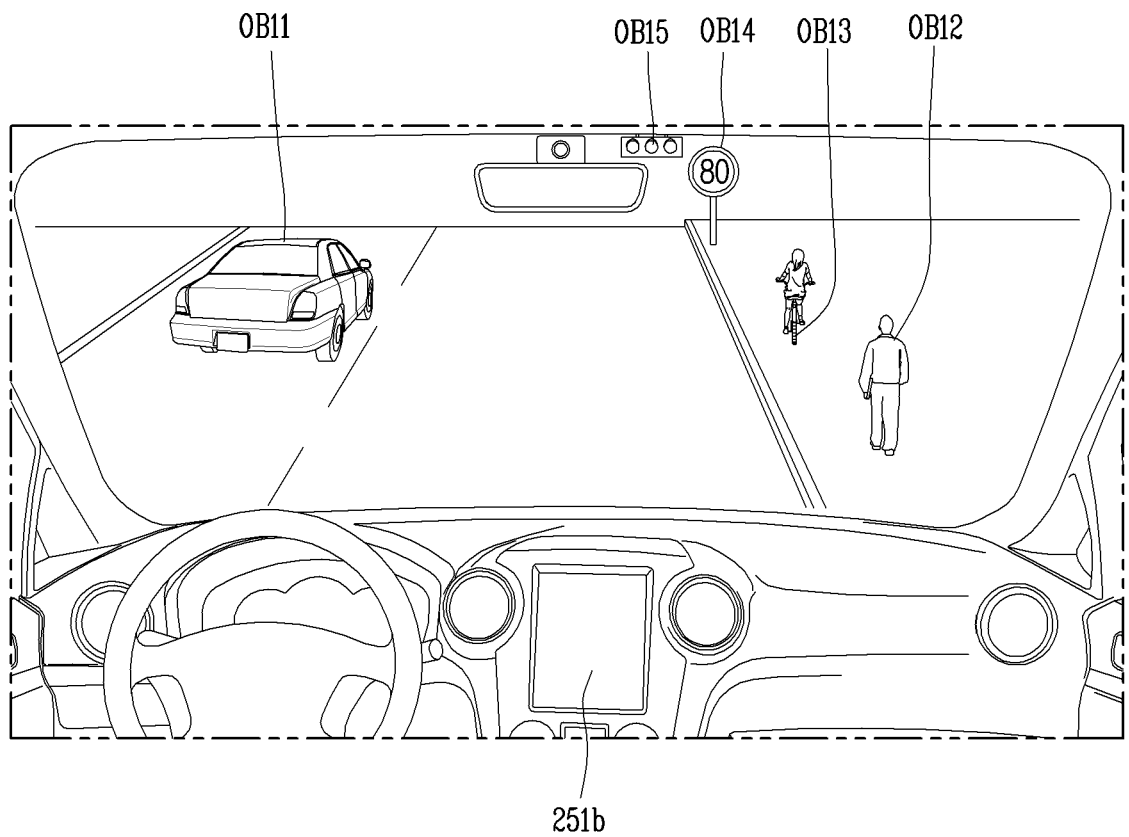

FIGS. 5 and 6 are diagrams illustrating example objects.

Figure 7:
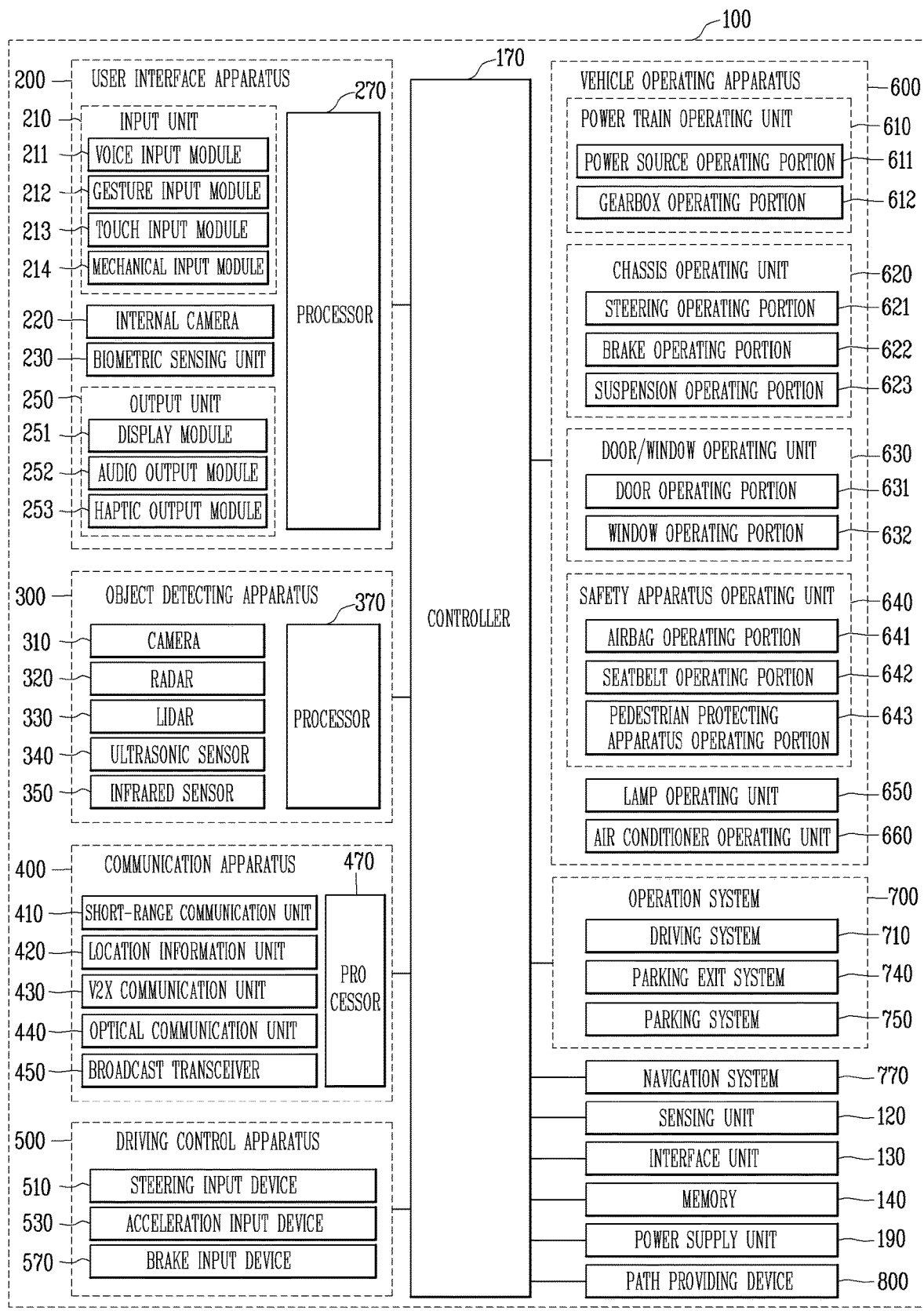
FIG. 7 is a block diagram illustrating an example vehicle.

FIG. 7 is a block diagram illustrating an example vehicle.

As illustrated in FIGS. 1 to 7, a vehicle 100 may include wheels turning by a driving force, and a steering input device 510 for adjusting a driving (proceeding, moving) direction of the vehicle 100.

The vehicle 100 may be an autonomous vehicle.

In some implementations, the vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In some examples, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140 (a non-transitory memory), a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as a processor 270.

In some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window, or the like.

The input unit 210 may include an audio input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some examples, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user may recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some examples, the user interface apparatus 200 may be referred to as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a (traffic) lane OB10, another vehicle OB11, a pedestrian OB12, a two-wheeled vehicle OB13, traffic signals OB14 and OB15, light, a road, a structure, a speed hump, a terrain, an animal and the like.

The lane OBO1 may be a driving lane, a lane next to the driving lane or a lane on which another vehicle comes in an opposite direction to the vehicle 100. The lanes OB10 may include left and right lines forming a lane.

The vehicle OB11 may be a vehicle which is traveling near the vehicle 100. The vehicle OB11 may be a vehicle located within a predetermined distance from the vehicle 100. For example, the vehicle OB11 may be a vehicle travelling ahead of or behind the vehicle 100. In some examples, the vehicle 100 may be a first vehicle, and the vehicle OB11 may be a second vehicle.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided at another vehicle. The light may be light generated from a streetlamp. The light may be solar light.

The road may include a road surface, a curve, an upward slope, a downward slope, and the like.

The structure may be an object that is located near a road and fixed on the ground. For example, the structure may include a streetlamp, a roadside tree, a building, an electric pole, a traffic light, a bridge, and the like.

The terrain may include a mountain, a hill, and the like.

In some examples, objects may be classified into a moving object and a fixed object. For instance, the moving object may include another vehicle or a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350 and at least one processor, such as a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some examples, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (proceeding) direction of the vehicle 100 from the user. The steering input device 510 may be configured in the form of a wheel allowing a steering input in a rotating manner. In some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 may be configured in the form of a pedal. In some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine may be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some examples, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce a speed of the vehicle 100.

In some examples, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some examples, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to implementations, the operation system 700 may further include other components in addition to components to be described, or may not include some of the components to be described.

In some examples, the operation system 700 may include at least one processor. Each unit of the operation system 700 may individually include at least one processor.

In some implementations, the operation system may be implemented by the controller 170 when it is implemented in a software configuration.

In some implementations, the operation system 700 may be implemented by at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some examples, the vehicle 100 according to the present disclosure may include a path providing device 800.

The path providing device 800 may control at least one of those components illustrated in FIG. 7. From this perspective, the path providing device 800 may be the controller 170.

Without a limit to this, the path providing device 800 may be a separate device, independent of the controller 170. When the path providing device 800 is implemented as a component independent of the controller 170, the path providing device 800 may be provided on a part of the vehicle 100. For instance, the path providing device 800 may include an electric circuit, a processor, a controller, a transceiver, or the like.

Hereinafter, description will be given of implementations in which the path providing device 800 is a component which is separate from the controller 170, for the sake of explanation. As such, according to implementations described in this disclosure, the functions (operations) and control techniques described in relation to the path providing device 800 may be executed by the controller 170 of the vehicle. However, every detail described in relation to the path providing device 800 may be applied to the controller 170 in the same/like manner.

Also, the path providing device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of a method of autonomously traveling a vehicle related to the present disclosure in an optimized manner or providing path information optimized for the travel of the vehicle, with reference to the accompanying drawings.

Figure 8:
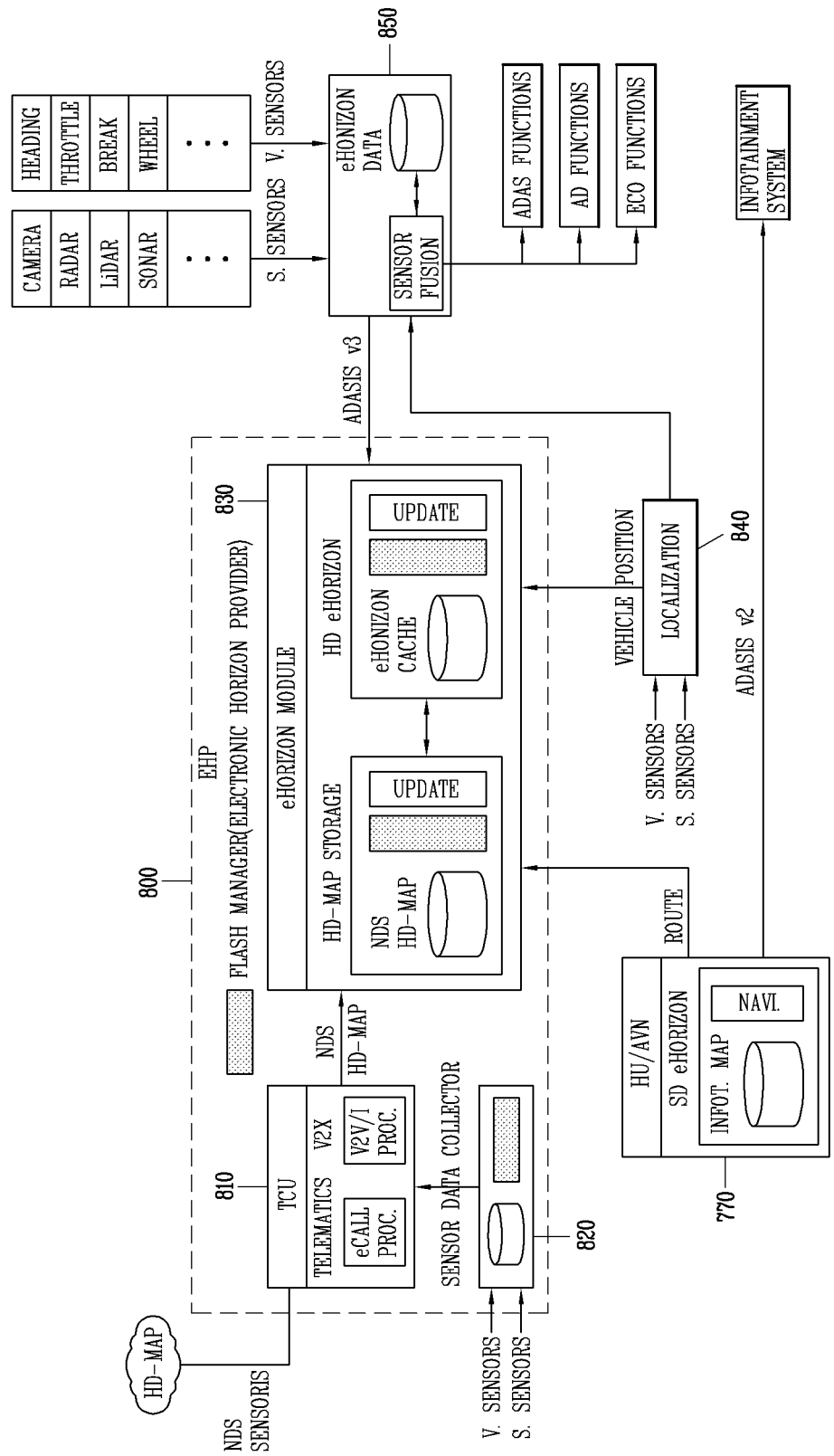
FIG. 8 is a schematic view illustrating an example of an Electronic Horizon Provider (EHP).

FIG. 8 is a diagram illustrating an example of an Electronic Horizon Provider (EHP) in accordance with the present disclosure.

Referring to FIG. 8, a path providing device 800 associated with the present disclosure may autonomously control the vehicle 100 based on eHorizon (electronic Horizon).

The path providing device 800 may be an electronic horizon provider (EHP).

In some examples, Electronic Horzion may be referred to as "ADAS Horizon," "ADASIS Horizon," "Extended Driver Horizon," or "eHorizon."

The eHorizon may be understood as software, a module or a system that performs the functions role of generating a vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (for example, an ECU, a controller 170, a navigation system 770, etc.) of the vehicle or in the vehicle requiring map information (or path information).

In some systems, the vehicle's forward path (or a path to the destination) is only provided as a single path based on a navigation map. In some implementations, eHorizon may provide lane-based path information based on a high-definition (HD) map.

Data generated by eHorizon may be referred to as "electronic horizon data" or "eHorizon data."

The electronic horizon data may be described as driving plan data used when generating a driving control signal of the vehicle 100 in a driving (traveling) system. For example, the electronic horizon data may be understood as driving plan data in a range from a point where the vehicle 100 is located to horizon.

Here, the horizon may be understood as a point in front of the point where the vehicle 100 is located, by a preset distance, on the basis of a preset travel path. The horizon may refer to a point where the vehicle 100 is to reach after a predetermined time from the point, at which the vehicle 100 is currently located, along a preset travel path. Here, the travel path refers to a path for the vehicle to travel up to a final destination, and may be set by a user input.

Electronic horizon data may include horizon map data and horizon path data. The horizon map data may include at least one of topology data, ADAS data, HD map data, and dynamic data. In some implementations, the horizon map data may include a plurality of layers. For example, the horizon map data may include a first layer that matches topology data, a second layer that matches ADAS data, a third layer that matches HD map data, and a fourth layer that matches dynamic data. The horizon map data may further include static object data.

Topology data may be described as a map created by connecting road centers. Topology data is suitable for roughly indicating the position of a vehicle and may be in the form of data mainly used in a navigation for a driver. Topology data may be understood as data for road information excluding lane-related information. Topology data may be generated based on data received by an infrastructure through V2I. Topology data may be based on data generated in an infrastructure. Topology data may be based on data stored in at least one memory included in the vehicle 100.

ADAS data may refer to data related to road information. ADAS data may include at least one of road slope data, road curvature data, and road speed limit data. ADAS data may further include no-passing zone data. ADAS data may be based on data generated in an infrastructure. ADAS data may be based on data generated by the object detecting apparatus 300. ADAS data may be named road information data.

HD map data may include detailed lane-unit topology information of a road, connection information of each lane, and feature information for localization of a vehicle (e.g., traffic signs, lane marking/attributes, road furniture, etc.). HD map data may be based on data generated in an infrastructure.

Dynamic data may include various dynamic information that may be generated on a road. For example, the dynamic data may include construction information, variable-speed lane information, road surface state information, traffic information, moving object information, and the like. Dynamic data may be based on data received by an infrastructure. Dynamic data may be based on data generated by the object detecting apparatus 300.

The path providing device 800 may provide map data within a range from a point where the vehicle 100 is located to the horizon. The horizon path data may be described as a trajectory that the vehicle 100 may take within the range from the point where the vehicle 100 is located to the horizon. The horizon path data may include data indicating a relative probability to select one road at a decision point (e.g., fork, intersection, crossroads, etc.). Relative probability may be calculated based on a time taken to arrive at a final destination. For example, if a shorter time is taken to arrive at the final destination when selecting a first road than when selecting a second road at a decision point, the probability to select the first road may be calculated higher than the probability to select the second road.

The horizon path data may include a main path and a sub path. The main path may be understood as a trajectory connecting roads with a higher relative probability to be selected. The sub path may be merged with or diverged from at least one point on the main path. The sub path may be understood as a trajectory connecting at least one road having a low relative probability to be selected at the at least one decision point on the main path.

eHorizon may be classified into categories such as software, a system, and the like. eHorizon denotes a configuration of fusing real-time events, such as road shape information of a high-definition map, real-time traffic signs, road surface conditions, accidents and the like, under a connected environment of an external server (cloud server), V2X (Vehicle to everything) or the like, and providing the fused information to the autonomous driving system and the infotainment system.

In other words, eHorizon may perform the role of transferring a road shape on a high-definition map and real-time events with respect to the front of the vehicle to the autonomous driving system and the infotainment system under an external server/V2X environment.

In order to effectively transfer (generate) eHorizon data (information) transmitted from eHorizon to the autonomous driving system and the infotainment system, a data specification and transmission method may be formed in accordance with a technical standard called "Advanced Driver Assistance Systems Interface Specification (ADASIS)."

The vehicle 100 related to the present disclosure may use information, which is received (generated) in eHorizon, in an autonomous driving system and/or an infotainment system.

For example, the autonomous driving system may use information provided by eHorizon in safety and ECO aspects.

In terms of the safety aspect, the vehicle 100 according to the present disclosure may perform an Advanced Driver Assistance System (ADAS) function such as Lane Keeping Assist (LKA), Traffic Jam Assist (TJA) or the like, and/or an AutoDrive (AD) function such as passing, road joining, lane change or the like, by using road shape information and event information received from eHorizon and surrounding object information sensed through the sensing unit 120 provided in the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect.

For example, the vehicle 100 may receive accident information, road surface condition information, and the like related to a road ahead of the vehicle from eHorizon, and output them on a display unit (e.g., Head Up Display (HUD), CID, Cluster, etc.) provided in the vehicle, so as to provide guide information for the driver to drive the vehicle safely.

eHorizon (external server) may receive position information related to various types of event information (e.g., road surface condition information, construction information, accident information, etc.) occurred on roads and/or road-based speed limit information from the vehicle 100 or other vehicles or may collect such information from infrastructures (e.g., measuring devices, sensing devices, cameras, etc.) installed on the roads.

In addition, the event information and the road-based speed limit information may be linked to map information or may be updated.

In addition, the position information related to the event information may be divided into lane units.

By using such information, the eHorizon system (EHP) of the present disclosure may provide information necessary for the autonomous driving system and the infotainment system to each vehicle, based on a high-definition map on which road conditions (or road information) may be determined on the lane basis.

In other words, an Electronic Horizon (eHorizon) Provider (EHP) of the present disclosure may provide an absolute high-definition map using absolute coordinates of road-related information (e.g., event information, position information regarding the vehicle 100, etc.) based on a high-definition map.

The road-related information provided by the eHorizon may be information included in a predetermined area (predetermined space) with respect to the vehicle 100.

The EHP may be understood as a component which is included in an eHorizon system and performs functions provided by the eHorizon (or eHorizon system).

The path providing device 800 of the present disclosure may be EHP, as shown in FIG. 8.

The path providing device 800 (EHP) of the present disclosure may receive a high-definition map from an external server (or a cloud server), generate path (route) information to a destination in lane units, and transmit the high-definition map and the path information generated in the lane units to a module or application (or program) of the vehicle requiring the map information and the path information.

Referring to FIG. 8, FIG. 8 illustrates an overall structure of an Electronic Horizon (eHorizon) system of the present disclosure.

The path providing device 800 (EHP) of the present disclosure may include a telecommunication control unit (TCU) 810 that receives a high-definition map (HD map) existing in a cloud server.

The TCU 810 may be the communication apparatus 400 described above, and may include at least one of components included in the communication apparatus 400.

The TCU 810 may include a telematics module or a vehicle to everything (V2X) module.

The TCU 810 may receive an HD map that complies with the Navigation Data Standard (NDS) (or conforms to the NDS standard) from the cloud server.

In addition, the HD map may be updated by reflecting data sensed by sensors provided in the vehicle and/or sensors installed around the road, according to the sensor ingestion interface specification (SENSORIS).

The TCU 810 may download the HD map from the cloud server through the telematics module or the V2X module.

The path providing device 800 (EHP) of the present disclosure may include a sensor data collector 820. The sensor data collector 820 collects (receives) information sensed by sensors (V.Sensors) provided in the vehicle for detecting a manipulation of the vehicle (e.g., heading, throttle, break, wheel, etc.) and sensors (S.Sensors) for detecting surrounding information of the vehicle (e.g., camera, radar, LiDAR, sonar, etc.)

The sensor data collector 820 may transmit the information sensed through the sensors provided in the vehicle to the TCU 810 (or a processor 830) so that the information is reflected in the HD map.

The TCU 810 may update the HD map stored in the cloud server by transmitting the information transmitted from the sensor data collector 820 to the cloud server.

The path providing device 800 (EHP) of the present disclosure may include a processor 830 (or an eHorizon module).

The processor 830 may control the TCU 810 and the sensor data collector 820.

The processor 830 may store the HD map received through the TCU 810, and update the HD map using the information received through the sensor data collector 820. This operation may be performed in the storage part 832 of the processor 830.

The processor 830 may receive first path information from an audio video navigation (AVN) or a navigation system 770.

The first path information is route information provided in the related art and may be information for guiding a traveling path (travel path, driving path, driving route) to a destination.

In this case, the first path information provided in the related art provides only one path information and does not distinguish lanes.

In some examples, when the processor 830 receives the first path information, the processor 830 may generate second path information for guiding, in lane units, a traveling path up to the destination set in the first path information, by using the HD map and the first path information. For example, the operation may be performed by a calculating part 834 of the processor 830.

In addition, the eHorizon system may include a localization unit 840 for identifying the position of the vehicle by using information sensed through the sensors (V.Sensors, S.Sensors) provided in the vehicle.

The localization unit 840 may transmit the position information of the vehicle to the processor 830 to match the position of the vehicle identified by using the sensors provided in the vehicle with the HD map.

The processor 830 may match the position of the vehicle 100 with the HD map based on the position information of the vehicle.

The processor 830 may generate electronic horizon data. The processor 830 may generate horizon path data.

The processor 830 may generate electronic horizon data by reflecting the traveling (driving) situation of the vehicle 100. For example, the processor 830 may generate electronic horizon data based on traveling direction data and traveling speed data of the vehicle 100.

The processor 830 may merge the generated electronic horizon data with previously-generated electronic horizon data. For example, the processor 830 may connect horizon map data generated at a first time point with horizon map data generated at a second time point on the position basis. For example, the processor 830 may connect horizon path data generated at a first time point with horizon path data generated at a second time point on the position basis.

The processor 830 may include a memory, an HD map processing part, a dynamic data processing part, a matching part, and a path generating part.

The HD map processing part may receive HD map data from a server through the TCU. The HD map processing part may store the HD map data. According to an implementation, the HD map processing part may also process the HD map data. The dynamic data processing part may receive dynamic data from the object detecting apparatus. The dynamic data processing part may receive the dynamic data from a server. The dynamic data processing part may store the dynamic data. In some implementations, the dynamic data processing part may process the dynamic data.

The matching part may receive an HD map from the HD map processing part. The matching part may receive dynamic data from the dynamic data processing part. The matching part may generate horizon map data by matching the HD map data with the dynamic data.

According to an implementation, the matching part may receive topology data. The matching part may receive ADAS data. The matching part may generate horizon map data by matching the topology data, the ADAS data, the HD map data, and the dynamic data. The path generating part may generate horizon path data. The path generating part may include a main path generator and a sub path generator. The main path generator may generate main path data. The sub path generator may generate sub path data.

In addition, the eHorizon system may include a fusion unit 850 for fusing information (data) sensed through the sensors provided in the vehicle and eHorizon data generated by the eHorizon module (control unit).

For example, the fusion unit 850 may update an HD map by fusing sensing data sensed by the vehicle with an HD map corresponding to eHorizon data, and provide the updated HD map to an ADAS function, an AutoDrive (AD) function, or an ECO function.

In some implementations, the fusion unit 850 may provide the updated HD map even to the infotainment system.

FIG. 8 illustrates that the path providing device 800 (EHP) of the present disclosure merely includes the TCU 810, the sensor data collector 820, and the processor 830, but the present disclosure is not limited thereto.

The path providing device 800 (EHP) of the present disclosure may further include at least one of the localization unit 840 and the fusion unit 850.

In addition, the path providing device 800 (EHP) of the present disclosure may further include a navigation system 770.

With such a configuration, when at least one of the localization unit 840, the fusion unit 850, and the navigation system 770 is included in the path providing device 800 (EHP) of the present disclosure, the functions/operations/controls performed by the included configuration may be understood as being performed by the processor 830.

Figure 9:
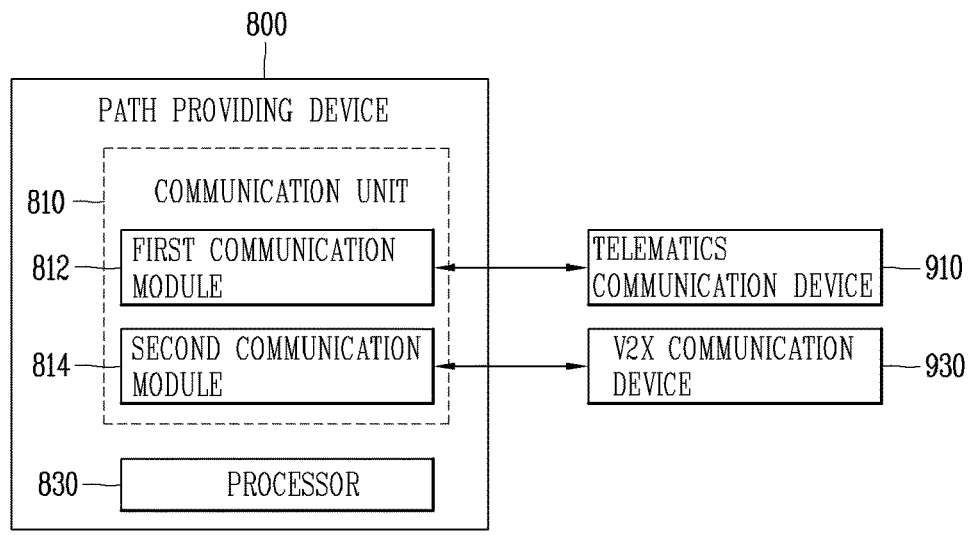
FIG. 9 is a block diagram illustrating an example of a path providing device of FIG. 8.

FIG. 9 is a block diagram illustrating an example of a path providing device (e.g., the path providing device of FIG. 8) in more detail.

The path providing device refers to a device for providing a route (or path) to a vehicle.

For example, the path providing device 800 may be a device mounted on a vehicle to perform communication through may communication and generate messages for controlling the vehicle and/or electric components mounted on the vehicle.

As another example, the path providing device 800 may be located outside the vehicle, like a server or a communication device, and may perform communication with the vehicle through a mobile communication network. In this case, the path providing device 800 may remotely control the vehicle and/or the electric components mounted on the vehicle using the mobile communication network.

The path providing device 800, which is provided in the vehicle, may be implemented as an independent device detachable from the vehicle or may be integrally installed on the vehicle to construct a part of the vehicle 100.

Referring to FIG. 9, the path providing device 800 includes a communication unit 810 and a processor 830.

The communication unit 810 is configured to communicate with various components provided in the vehicle.

For example, the communication unit 810 may receive various information provided through a controller area network (CAN).

The communication unit 810 may include a first communication module 812, and the first communication module 812 may receive an HD map provided through telematics. In other words, the first communication module 812 is configured to perform "telematics communication." The first communication module 812 performing the telematics communication may communicate with a server and the like by using a satellite navigation system or a base station provided by mobile communications such as 4G or 5G. For instance, the first communication module 812 may include an electric circuit, a processor, a controller, a transceiver, or the like.

The first communication module 812 may perform communication with a telematics communication device 910. The telematics communication device 910 may include a server provided by a portal provider, a vehicle provider and/or a mobile communication company.

The processor 830 of the path providing device 800 may determine absolute coordinates of road-related information (event information) based on ADAS MAP received from an external server (eHorizon) through the first communication module 812. In addition, the processor 830 may autonomously drive the vehicle 100 or perform a vehicle control using the absolute coordinates of the road-related information (event information). For instance, the processor 830 may include an electric circuit, an integrated circuit, or the like.

The communication unit 810 may include a second communication module 814, and the second communication module 814 may receive various types of information provided through vehicle to everything (V2X) communication. In other words, the second communication module 814 is configured to perform "V2X communication." The V2X communication may be defined as a technology of exchanging or sharing information, such as traffic condition and the like, while communicating with road infrastructures and other vehicles during driving. For instance, the second communication module 814 may include an electric circuit, a processor, a controller, a transceiver, or the like.

The second communication module 814 may perform communication with a V2X communication device 930. The V2X communication device 930 may include a mobile terminal belonged to a pedestrian or a person riding a bike, a fixed terminal installed on a road, another vehicle, and the like.

Here, the another vehicle may denote at least one of vehicles existing within a predetermined distance from the vehicle 100 or vehicles approaching by a predetermined distance or shorter with respect to the vehicle 100.

The present disclosure may not be limited thereto, and the another vehicle may include all the vehicles capable of communicating with the communication unit 810. According to this specification, for the sake of explanation, an example will be described in which the another vehicle is at least one vehicle existing within a predetermined distance from the vehicle 100 or at least one vehicle approaching by the predetermined distance or shorter with respect to the vehicle 100.

The predetermined distance may be determined based on a distance capable of performing communication through the communication unit 810, determined according to a specification of a product, or determined/varied based on a user's setting or V2X communication standard.

The second communication module 814 may be configured to receive LDM data from another vehicle. The LDM data may be a V2X message (BSM, CAM, DENM, etc.) transmitted and received between vehicles through V2X communication.

The LDM data may include position (or location) information related to another vehicle.

The processor 830 may determine a position of the vehicle 100 relative to the another vehicle, based on the position information related to the vehicle 100 and the position information related to the another vehicle included in the LDM data received through the second communication module 814.

In addition, the LDM data may include speed information regarding another vehicle. The processor 830 may also determine a relative speed of the another vehicle using speed information of the vehicle 100 and the speed information of the another vehicle. The speed information of the vehicle 100 may be calculated using a degree to which the location information of the vehicle 100 received through the communication unit 810 changes over time or calculated based on information received from the driving control apparatus 500 or the power train operating unit 610 of the vehicle 100.

The second communication module 814 may be the V2X communication unit 430 described above.

The communication unit 810 may receive information related to driving of the vehicle from most of electric components provided in the vehicle 100. Information transmitted from the electric components provided in the vehicle to the path providing device 800 is referred to as "vehicle driving information (or vehicle travel information)."

Vehicle driving information includes vehicle information and surrounding information related to the vehicle. Information related to the inside of the vehicle with respect to a frame of the vehicle may be defined as the vehicle information, and information related to the outside of the vehicle may be defined as the surrounding information.

The vehicle information refers to information related to the vehicle itself. For example, the vehicle information may include a traveling speed, a traveling direction, an acceleration, an angular velocity, a location (GPS), a weight, a number of passengers on board the vehicle, a braking force of the vehicle, a maximum braking force, air pressure of each wheel, a centrifugal force applied to the vehicle, a driving (or drive) mode of the vehicle (autonomous driving mode or manual driving mode), a parking mode of the vehicle (autonomous parking mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (or following) vehicle, a relative speed of a preceding (or following) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may also include ambient brightness, temperature, a position of the sun, information related to a nearby subject (a person, another vehicle, a sign, etc.), a type of a driving road surface, a landmark, (traffic) line information, and driving lane information, and information required for an autonomous driving/autonomous parking/automatic parking/manual parking mode.

In addition, the surrounding information may further include a distance from an object existing nearby to the vehicle, collision possibility, a type of an object, a parking space for the vehicle, an object for identifying the parking space (e.g., a parking line, a string, another vehicle, a wall, etc.), and the like.

The vehicle driving information is not limited to the example described above and may include all information generated from the components provided in the vehicle.

In some examples, the processor 830 is configured to control one or more electric components provided in the vehicle using the communication unit 810.

Specifically, the processor 830 may determine whether or not at least one of a plurality of preset or predetermined conditions is satisfied, based on vehicle driving information received through the communication unit 810. According to a satisfied condition, the processor 830 may control the one or more electric components in different ways.

Based on the predetermined conditions, the processor 830 may detect an occurrence of an event in an electric component provided in the vehicle and/or application, and determine whether the detected event meets a predetermined condition. At this time, the processor 830 may also detect the occurrence of the event from information received through the communication unit 810.

The application may be implemented, for example, as a widget, a home launcher, and the like, and refers to various types of programs that may be executed on the vehicle. Accordingly, the application may be a program that performs various functions, such as a web browser, a video playback, message transmission/reception, schedule management, or application update.

In addition, the application may include at least one of forward collision warning (FCW), blind spot detection (BSD), lane departure warning (LDW), pedestrian detection (PD), Curve Speed Warning (CSW), and turn-by-turn navigation (TBT).

For example, the occurrence of the event may be a missed call, presence of an application to be updated, a message arrival, start on, start off, autonomous travel on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be an occurrence of forward collision warning, an occurrence of blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various electronic control units (ECUs) provided in the vehicle perform specific functions, it may be determined as the occurrence of the events.

For example, when a generated event satisfies the predetermined condition, the processor 830 may control the communication unit 810 to display information corresponding to the satisfied condition on one or more displays provided in the vehicle.

Figure 10:
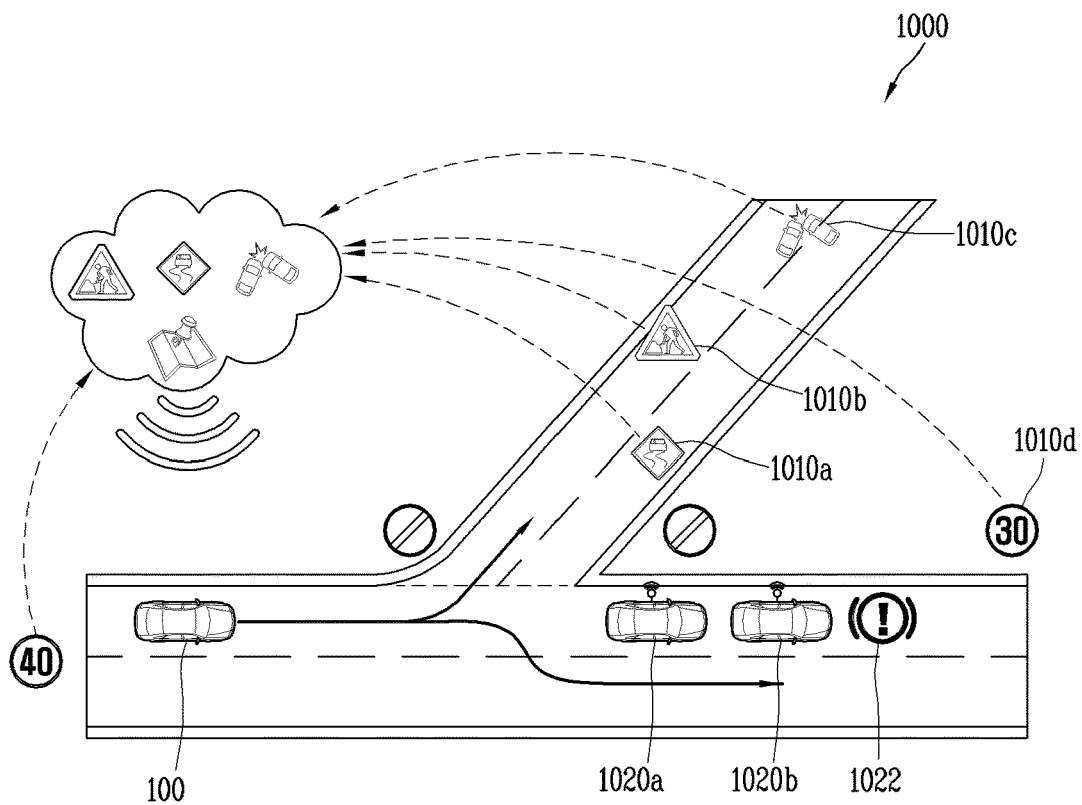
FIG. 10 is a diagram illustrating an example of eHorizon.

FIG. 10 is a diagram illustrating an example of eHorizon in accordance with the present disclosure.

Referring to FIG. 10, the path providing device 800 according to the present disclosure may autonomously drive the vehicle 100 based on eHorizon.

eHorizon may be classified into categories such as software, a system, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems.

For example, eHorizon may refer to an external server (a cloud or a cloud server).

In other words, eHorizon may perform the role of transferring a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The path providing device 800 related to the present disclosure may use information, which is received from eHorizon, in the autonomous driving system and/or the infotainment system.

For example, the autonomous driving system may be divided into a safety aspect and an ECO aspect.

In terms of the safety aspect, the path providing device 800 according to the present disclosure may perform an Advanced Driver Assistance System (ADAS) function such as Lane Keeping Assist (LKA), Traffic Jam Assist (TJA) or the like, and/or an AutoDrive (AD) function such as passing, road joining, lane change or the like, by using road shape information and event information received from eHorizon and surrounding object information sensed through the localization unit 840 provided in the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect.

For example, the path providing device 800 may receive from eHorizon accident information, road surface condition information, and the like related to a road ahead of the vehicle and output them on a display unit (e.g., Head Up Display (HUD), CID, Cluster, etc.) provided in the vehicle, so as to provide guide information for the driver to drive the vehicle safely.

Referring to FIG. 10, the eHorizon (external server) may receive location information related to various types of event information (e.g., road surface condition information 1010*a*, construction information 1010*b*, accident information 1010*c*, etc.) occurred on roads and/or road-based speed limit information 1010*d* from the vehicle 100 or other vehicles 1020*a* and 1020*b*, or may collect such information from infrastructures (e.g., measuring devices, sensing devices, cameras, etc.) installed on the roads.

Furthermore, the event information and the road-based speed limit information may be linked to map information, or may be updated.

In addition, the location information related to the event information may be divided into lane units.

By using such information, the eHorizon (external server) of the present disclosure may provide information necessary for the autonomous driving system and the infotainment system to each vehicle, based on a high-definition map capable of determining a road situation (or road information) in units of lanes of the road.

In other words, the eHorizon (external server) of the present disclosure may provide an absolute high-definition map using absolute coordinates of road-related information (e.g., event information, position information regarding the vehicle 100, etc.) based on a high-definition map.

The road-related information provided by the eHorizon may be information corresponding to a predetermined region (predetermined space) with respect to the vehicle 100.

In some examples, the path providing device 800 of the present disclosure may acquire position information related to another vehicle through communication with the another vehicle. Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the foregoing ADAS MAP in the data format and transmission method. For example, the ADAS MAP may correspond to a high-definition map having absolute coordinates received from eHorizon (external server), and the LDM may denote a high-definition map having relative coordinates based on data transmitted and received through V2X communication.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication).

The LDM may be implemented, for example, by a storage for storing data transmitted and received through V2X communication, and the LDM may be formed (stored) in a vehicle control device provided in each vehicle.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication). The LDM data may include a Basic Safety Message (BSM), a Cooperative Awareness Message (CAM), and a Decentralized Environmental Notification message (DENM), and the like, for example.

The LDM data may be referred to as a V2X message or an LDM message, for example.

The vehicle control device related to the present disclosure may efficiently manage LDM data (or V2X messages) transmitted and received between vehicles using the LDM.

Based on LDM data received via V2X communication, the LDM may store, distribute to another vehicle, and continuously update all relevant information (e.g., a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For example, a V2X application provided in the path providing device 800 registers in the LDM, and receives a specific message such as all the DENMs in addition to a warning about a failed (or broken) vehicle. Then, the LDM may automatically assign the received information to the V2X application, and the V2X application may control the vehicle based on the information assigned from the LDM.

As described above, the vehicle 100 of the present disclosure may control the vehicle using the LDM formed by the LDM data collected through V2X communication.

The LDM associated with the present disclosure may provide road-related information to the vehicle control device. The road-related information provided by the LDM provides only a relative distance and a relative speed with respect to another vehicle (or an event generation point), other than map information having absolute coordinates.

In other words, the vehicle 100 of the present disclosure may perform autonomous driving using an ADAS MAP (absolute coordinates HD map) according to the ADASIS standard provided by eHorizon, but the map may be used only to determine a road condition in a surrounding area of the vehicle 100.

In addition, the vehicle 100 of the present disclosure may perform autonomous driving using an LDM (relative coordinates HD map) formed by LDM data received through V2X communication, but there is a limitation in that accuracy is inferior due to insufficient absolute position information.

The vehicle control device included in the vehicle of the present disclosure may generate a fused definition map using the ADAS MAP received from the eHorizon and the LDM data received through the V2X communication, and control (autonomously drive) the vehicle in an optimized manner using the fused definition map.

Figure 11A:
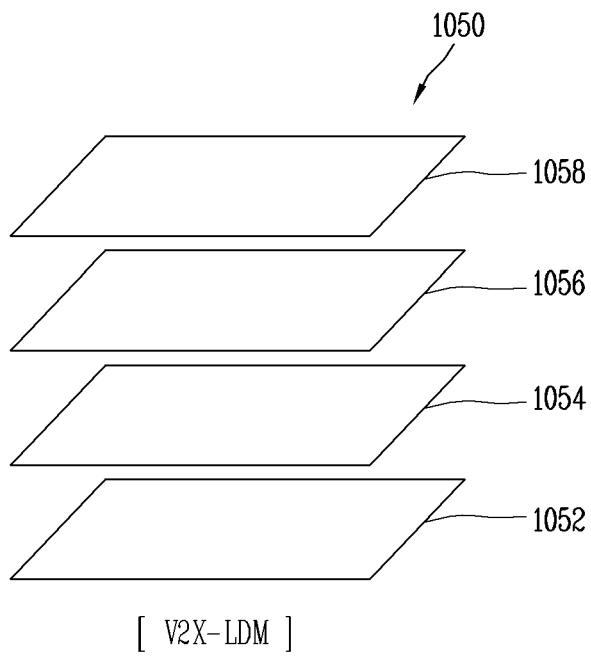
FIGS. 11A and 11B are diagrams illustrating examples of a Local Dynamic Map (LDM) and an Advanced Driver Assistance System (ADAS) MAP.
Figure 11B:
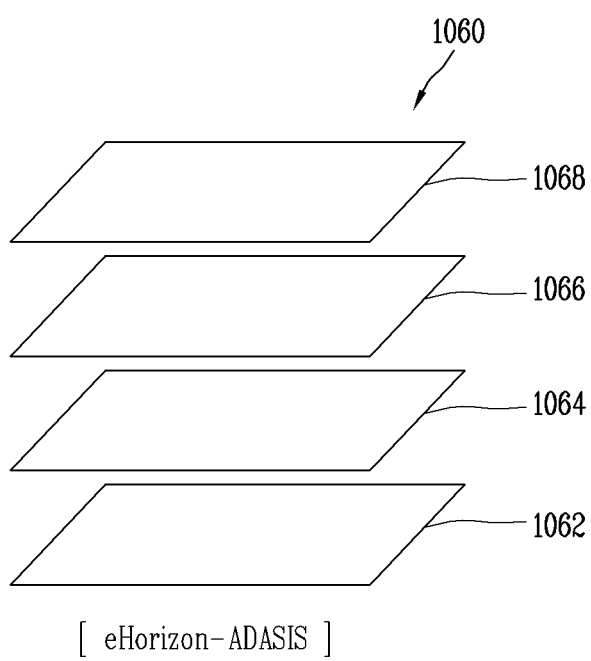

FIG. 11A illustrates an example of a data format of LDM data (or LDM) transmitted and received between vehicles via V2X communication, and FIG. 11B illustrates an example of a data format of an ADAS MAP received from an external server (eHorizon).

Referring to FIG. 11A, the LDM data (or LDM) 1050 may be formed to have four layers.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (for example, specific place information specified by a maker among a plurality of place information included in the map information) among information associated with roads. The landmark information may include location information, name information, size information, and the like.

The third layer 1056 may include traffic situation related information (e.g., traffic light information, construction information, accident information, etc.) among information associated with roads. The construction information and the accident information may include position information.

The fourth layer 1058 may include dynamic information (e.g., object information, pedestrian information, other vehicle information, etc.) among the road-related information. The object information, pedestrian information, and other vehicle information may include location information.

In other words, the LDM data 1050 may include information sensed through a sensing unit of another vehicle or information sensed through the sensing unit of the vehicle 100 of the present disclosure, and may include road-related information that is transformed in real time as it goes from the first layer to the fourth layer.

Referring to FIG. 11B, the ADAS MAP may be formed to have four layers similar to the LDM data.

The ADAS MAP 1060 may denote data received from eHorizon and formed to conform to the ADASIS specification.

The ADAS MAP 1060 may include a first layer 1062 to a fourth layer 1068.

The first layer 1062 may include topology information. The topology information, for example, is information that explicitly defines a spatial relationship, and may indicate map information.

The second layer 1064 may include landmark information (e.g., specific place information specified by a maker among a plurality of place information included in the map information) among information associated with the road. The landmark information may include position information, name information, size information, and the like.

The third layer 1066 may include high-definition map information. The high-definition map information may be referred to as an HD-MAP, and road-related information (e.g., traffic light information, construction information, accident information) may be recorded in the lane unit. The construction information and the accident information may include location information.

The fourth layer 1068 may include dynamic information (e.g., object information, pedestrian information, other vehicle information, etc.). The object information, pedestrian information, and other vehicle information may include location information.

In other words, the ADAS MAP 1060 may include road-related information that is transformed in real time as it goes from the first layer to the fourth layer, similarly to the LDM data 1050.

The processor 830 may autonomously drive the vehicle 100.

For example, the processor 830 may autonomously drive the vehicle 100 based on vehicle driving information sensed through various electric components provided in the vehicle 100 and information received through the communication unit 810.

In detail, the processor 830 may control the communication unit 810 to acquire the position information of the vehicle 100. For example, the processor 830 may acquire the position information (location coordinates) of the vehicle 100 through the location information unit 420 of the communication unit 810.

Furthermore, the processor 830 may control the first communication module 812 of the communication unit 810 to receive map information from an external server. Here, the first communication module 812 may receive ADAS MAP from the external server (eHorizon). The map information may be included in the ADAS MAP.

In addition, the processor 830 may control the second communication module 814 of the communication unit 810 to receive position information of another vehicle from the another vehicle. Here, the second communication module 814 may receive LDM data from the another vehicle. The position information of the another vehicle may be included in the LDM data.

The another vehicle denotes a vehicle existing within a predetermined distance from the vehicle 100, and the predetermined distance may be a communication-available distance (or communication range) of the communication unit 810 or a distance set by a user.

The processor 830 may control the communication unit 810 to receive the map information from the external server and the position information of the another vehicle from the another vehicle.

Furthermore, the processor 830 may fuse the acquired position information of the vehicle and the received position information of the another vehicle into the received map information, and control the vehicle 100 based on at least one of the fused map information and vehicle-related information sensed through the localization unit 840.

Here, the map information received from the external server may denote HD-MAP included in the ADAS MAP. The HD-MAP information may be recorded with road-related information in the lane unit.

The processor 830 may fuse the position information of the vehicle 100 and the position information of the another vehicle into the map information in the lane unit. In addition, the processor 830 may fuse the road-related information received from the external server and the road-related information received from the another vehicle into the map information in the lane unit.

The processor 830 may generate ADAS MAP required for the control of the vehicle using the ADAS MAP received from the external server and the vehicle-related information received through the sensing unit 120.

In detail, the processor 830 may apply the vehicle-related information sensed within a predetermined range through the sensing unit 120 to the map information received from the external server.

Here, the predetermined range may be an available distance which may be sensed by an electric component provided in the vehicle 100 or may be a distance set by a user.

The processor 830 may control the vehicle by applying the vehicle-related information sensed within the predetermined range through the sensing unit to the map information and then additionally fusing the location information of the another vehicle thereto.

In other words, when the vehicle-related information sensed within the predetermined range through the sensing unit is applied to the map information, the processor 830 may use only the information within the predetermined range from the vehicle, and thus a range capable of controlling the vehicle may be local.

However, the position information of the another vehicle received through the V2X module may be received from the another vehicle existing in a space out of the predetermined range. It may be because the communication-available distance of the V2X module communicating with the another vehicle through the V2X module is farther than a predetermined range of the sensing unit 120.

As a result, the processor 830 may fuse the location information of the another vehicle included in the LDM data received through the second communication module 814 into the map information on which the vehicle-related information has been sensed, so as to acquire the location information of the another vehicle existing in a broader range and more effectively control the vehicle using the acquired information.

For example, it is assumed that a plurality of other vehicles is crowded ahead in a lane in which the vehicle 100 of the present disclosure exists, and it is also assumed that the sensing unit may sense only location information related to an immediately preceding vehicle.

In this case, when only vehicle-related information sensed within a predetermined range on map information is used, the processor 830 may generate a control command for controlling the vehicle such that the vehicle 100 overtakes the preceding vehicle.

However, a plurality of other vehicles may actually exist ahead, which may make the vehicle difficult to overtake other vehicles.

At this time, the present disclosure may acquire the location information of another vehicle received through the V2X module. Here, the received location information related to the another vehicle may include location information related to not only the vehicle in front of the vehicle 100 but also a plurality of other vehicles ahead of the preceding vehicle.

The processor 830 may additionally fuse the location information related to the plurality of other vehicles acquired through the V2X module into map information to which the vehicle-related information is applied, so as to determine a situation where it is inappropriate to overtake the preceding vehicle.

With such configuration, the present disclosure may overcome the related art technical limitation that only vehicle-related information acquired through the sensing unit 120 is merely fused to high-definition map information and thus autonomous driving is enabled only within a predetermined range. In other words, the present disclosure may achieve more accurate and stable vehicle control by additionally fusing information related to other vehicles (e.g., speeds, locations of other vehicles), which have been received from the other vehicles located at a farther distance than the predetermined range through the V2X module, as well as vehicle-related information sensed through the sensing unit, into map information.

Vehicle control described herein may include at least one of autonomously driving the vehicle 100 and outputting a warning message associated with the driving of the vehicle 100.

Hereinafter, description will be given in more detail of a method in which a processor controls a vehicle using LDM data received through a V2X module, ADAS MAP received from an external server (eHorizon), and vehicle-related information sensed through a sensing unit provided in the vehicle, with reference to the accompanying drawings.

FIG. 12 is a flowchart illustrating an example of a path providing method of the path providing device of FIG. 9.

The processor 830 receives a high-definition (HD) map from an external server (S1210).

The external server is a device capable of performing communication through the first communication module 812 and is an example of the telematics communication device 910. The HD map is ADAS MAP and may include at least one of the four layers described above with reference to FIG. 11B.

The processor 830 may generate forward path information for guiding a road located ahead of the vehicle in lane units using the HD map (S1220).

The processor 830 may generate different forward path information depending on whether a destination is set in the vehicle 100.

For example, when a destination is set in the vehicle 100, the processor 830 may generate forward path information for guiding a driving path (travel path) to the destination in the lane units.

As another example, when a destination is not set in the vehicle 100, the processor 830 may calculate a main path (Most Preferred Path (MPP)) on which the vehicle 100 is most likely to travel, and generate forward path information for guiding the main path (MPP) in the lane units. In this case, the forward path information may further include sub path information related to a sub path, which is branched from the main path (MPP) and on which the vehicle 100 is likely to travel with a higher probability than a predetermined reference.

The forward path information may provide a driving path up to a destination for each lane drawn on the road, thereby providing more precise and detailed path information. The forward path information may be path information that complies with the standard of ADASIS v3.

The forward path information may be provided by subdividing a path, on which the vehicle should travel or may travel, into lane units. The forward path information may be information for guiding a driving path to a destination on the lane basis. When the forward path information is displayed on a display mounted on the vehicle 100, a guide line for guiding a lane on which the vehicle 100 may travel may be displayed on the map. In addition, a graphic object indicating the location of the vehicle 100 may be included on at least one lane in which the vehicle 100 is located among a plurality of lanes included in the map.

The processor 830 may provide the forward path information to at least one electric component provided in the vehicle (S1230). In addition, the processor 830 may also provide the forward path information to various applications installed in the systems of the vehicle 100.

The electric component refers to any device mounted on the vehicle 100 and capable of performing communication, and may include the components 120 to 700 described above with reference to FIG. 7. For example, the object detecting apparatus 300 such as a radar or a LiDAR, the navigation system 770, the vehicle operating apparatus 600, and the like may be included in the electric components.

The electric component may perform its own function based on the forward path information.

The forward path information may include a path in lane units and the location of the vehicle 100, and may include dynamic information including at least one object to be sensed by the electric component. The electric component may reallocate resources to sense an object corresponding to the dynamic information, determine whether the dynamic information matches sensing information sensed by the electric component itself, or change a setting value for generating sensing information.

Next, the processor 830 may receive external information generated by an external device from the external device which is located within a predetermined range with respect to the vehicle (S1240).

The predetermined range refers to a distance at which the second communication module 814 may perform communication, and may vary according to performance of the second communication module 814. When the second communication module 814 performs V2X communication, a V2X communication-available range may be defined as the predetermined range.

Furthermore, the predetermined range may vary according to an absolute speed of the vehicle 100 and/or a relative speed with the external device.

The processor 830 may determine the predetermined range based on the absolute speed of the vehicle 100 and/or the relative speed with the external device, and permit the communication with external devices located within the determined predetermined range.

In detail, based on the absolute speed of the vehicle 100 and/or the relative speed with the external device, external devices that may perform communication through the second communication module 814 may be classified into a first group or a second group. External information received from an external device included in the first group is used to generate dynamic information, which will be described below, but external information received from an external device included in the second group is not used to generate the dynamic information. Even when external information is received from the external device included in the second group, the processor 830 ignores the external information.

The processor 830 may generate dynamic information related to an object to be sensed by at least one electric component provided in the vehicle based on the external information (S1250), and match the dynamic information to the forward path information (S1260).

For example, the dynamic information may correspond to the fourth layer described above with reference to FIGS. 11A and 11B.

As described above with reference to FIGS. 11A and 11B, the path providing device 800 may receive the ADAS MAP and/or the LDM data. In detail, the path providing device 800 may receive the ADAS MAP from the telematics communication device 910 through the first communication module 812, and the LDM data from the V2X communication device 930 through the second communication module 814.

The ADAS MAP and the LDM data may be provided with a plurality of layers each having the same format. The processor 830 may select at least one layer from the ADAS MAP, select at least one layer from the LDM data, and generate the forward path information including the selected layers.

For example, after selecting the first to third layers of the ADAS MAP and selecting the fourth layer of the LDM data, one forward path information may be generated by matching those four layers into one. In this case, the processor 830 may transmit a refusal message for refusing the transmission of the fourth layer to the telematics communication device 910. This is because receiving partial information excluding the fourth layer uses less resources of the first communication module 812 than receiving all information including the fourth layer. By matching part of the ADAS MAP with part of the LDM data, complementary information may be utilized.

As another example, after selecting the first to fourth layers of the ADAS MAP and selecting the fourth layer of the LDM data, one forward path information may be generated by matching those five layers into one. In this case, priority may be given to the fourth layer of the LDM data. If the fourth layer of the ADMS MAP includes information which is inconsistent with the fourth layer of the LDM data, the processor 830 may delete the inconsistent information or correct the inconsistent information based on the LDM data.

The dynamic information may be object information for guiding a predetermined object. For example, the dynamic information may include at least one of position coordinates for guiding the position of the predetermined object, and information guiding the shape, size, and kind of the predetermined object.

The predetermined object may refer to an object that disturbs driving in a corresponding lane among objects that may be driven on a road.

For example, the predetermined object may include a bus stopped at a bus stop, a taxi stopped at a taxi stand or a truck from which package boxes are being put down.

As another example, the predetermined object may include a garbage truck that travels at a predetermined speed or slower or a large-sized vehicle (e.g., a truck or a container truck, etc.) that is determined to obstruct a driver's vision.

As another example, the predetermined object may include an object informing of an accident, road damage, or construction.

As described above, the predetermined object may include all kinds of objects blocking a lane so that driving of the vehicle 100 is impossible or interrupted. The predetermined object may correspond to an icy road, a pedestrian, another vehicle, a construction sign, a traffic signal such as a traffic light, or the like that the vehicle 100 should avoid, and may be received by the path providing device 800 as the external information.

The processor 830 may determine whether or not the predetermined object offered by the external information is located within a reference range based on the travel (or driving) path of the vehicle 100.

Whether or not the predetermined object is located within the reference range may vary depending on a lane in which the vehicle 100 is traveling and a position where the predetermined object is located.

For example, external information for guiding a sign indicating the construction on a third lane 1 km ahead of the vehicle while the vehicle is traveling in a first lane may be received. If the reference range is set to 1 m based on the vehicle 100, the sign is located outside the reference range. This is because the third lane is located outside the reference range of 1 m based on the vehicle 100 if the vehicle 100 is continuously traveling in the first lane. In some cases, if the reference range is set to 10 m based on the vehicle 100, the sign is located within the reference range.

The processor 830 may generate the dynamic information based on the external information when the predetermined object is located within the reference range, but may not generate the dynamic information when the predetermined object is located outside the reference range. That is, the dynamic information may be generated only when the predetermined object guided by the external information is located on the driving path of the vehicle 100 or is within a reference range that may affect the driving path of the vehicle 100.

The path providing device according to the present disclosure may generate the forward path information by integrating information received through the first communication module and information received through the second communication module into one, which may result in generating and providing optimal forward path information capable of complementing different types of information provided through such different communication modules. This is because information received through the first communication module cannot reflect information in real time but such limitation may be complemented by information received through the second communication module.

Furthermore, when there is information received through the second communication module, the processor 830 controls the first communication module so as not to receive information corresponding to the received information, so that the bandwidth of the first communication module may be used less than that used in the related art. That is, the resource usage of the first communication module may be minimized.

Figure 13:
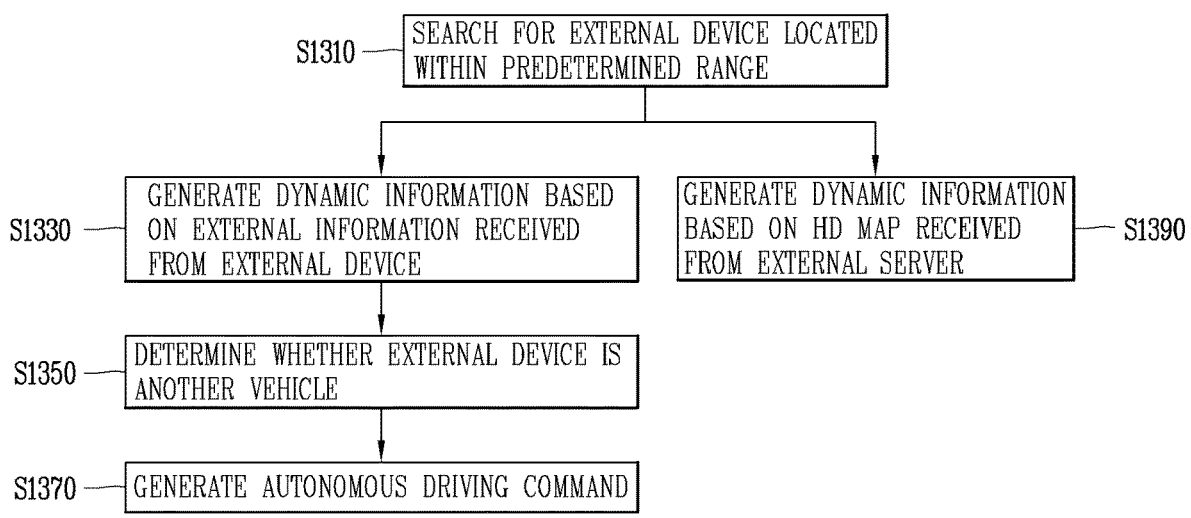
FIG. 13 is a flowchart illustrating an example method for generating dynamic information based on different information depending on presence or absence of an external device.

FIG. 13 is a flowchart illustrating an example method for generating dynamic information based on different information depending on presence or absence of an external device.

The processor 830 may search for an external device located within the predetermined range, and generate the dynamic information based on different information depending on presence or absence of the external device.

First, the processor 830 searches for an external device located within the predetermined range (S1310).

The processor 830 may analyze information received through the second communication module 814 to determine whether the external device is located within the predetermined range. The predetermined range may vary according to an absolute speed of the vehicle 100 and/or a relative speed with the external device.

When the external device is not located within the predetermined range, namely, when there is no external device, dynamic information is generated based on an HD map received from the telematics communication device 910 through the first communication module 812 (S1390). Here, the dynamic information may be additionally generated or updated based on vehicle driving information received from one or more electric devices mounted on the vehicle 100.

In contrast, when the external device is located within the predetermined range, dynamic information is generated based on the external information received from the external device through the second communication module 814 (S1330). The external device refers to the V2X communication device 930 described above with reference to FIG. 9.

When the external device is present, the processor 830 controls the first communication module 812 such that the dynamic information is not transmitted from the telematics communication device 910 through the first communication module 812. For example, the processor 830 may send a "transmission stop" message to the telematics communication device 910, filter information corresponding to the dynamic information among information received from the telematics communication device 910 to delete, or restrict information corresponding to the dynamic information from being transmitted to the path providing device 800.

Further, the processor 830 determines whether the external device is another vehicle that is traveling on the road (S1350). When the external device is the another vehicle, the processor 830 may generate an autonomous driving command regardless of the driver's intention so that a predetermined distance from the another vehicle is maintained (S1370).

The absolute coordinates of the predetermined range constantly change as the vehicle 100 is traveling on the road. An object that is consistently located within the constantly changing range is likely to be another vehicle moving on the same road in the same direction. As the another vehicle detects a predetermined object that the vehicle 100 cannot detect and external information regarding the predetermined object is provided through the second communication module 814, the vehicle 100 may drive more safely using this external information. Accordingly, the path providing device 800 may generate an autonomous driving command so that the external information is continuously transmitted from the another vehicle and the predetermined distance from the another vehicle is maintained. The autonomous driving command may allow a speed of the vehicle 100 to be adjusted, or a driving direction of the vehicle 100 to be changed.

In some examples, when the external device is the another vehicle, the processor 830 may determine whether or not the dynamic information based on the external information is generated according to at least one of a distance from the another vehicle, a relative speed with the another vehicle, a driving direction of the another vehicle, and a destination of the another vehicle. This is to generate the dynamic information in a limited situation (or circumstance) in which the external information may be stably received through the second communication module 814.

Figure 14:
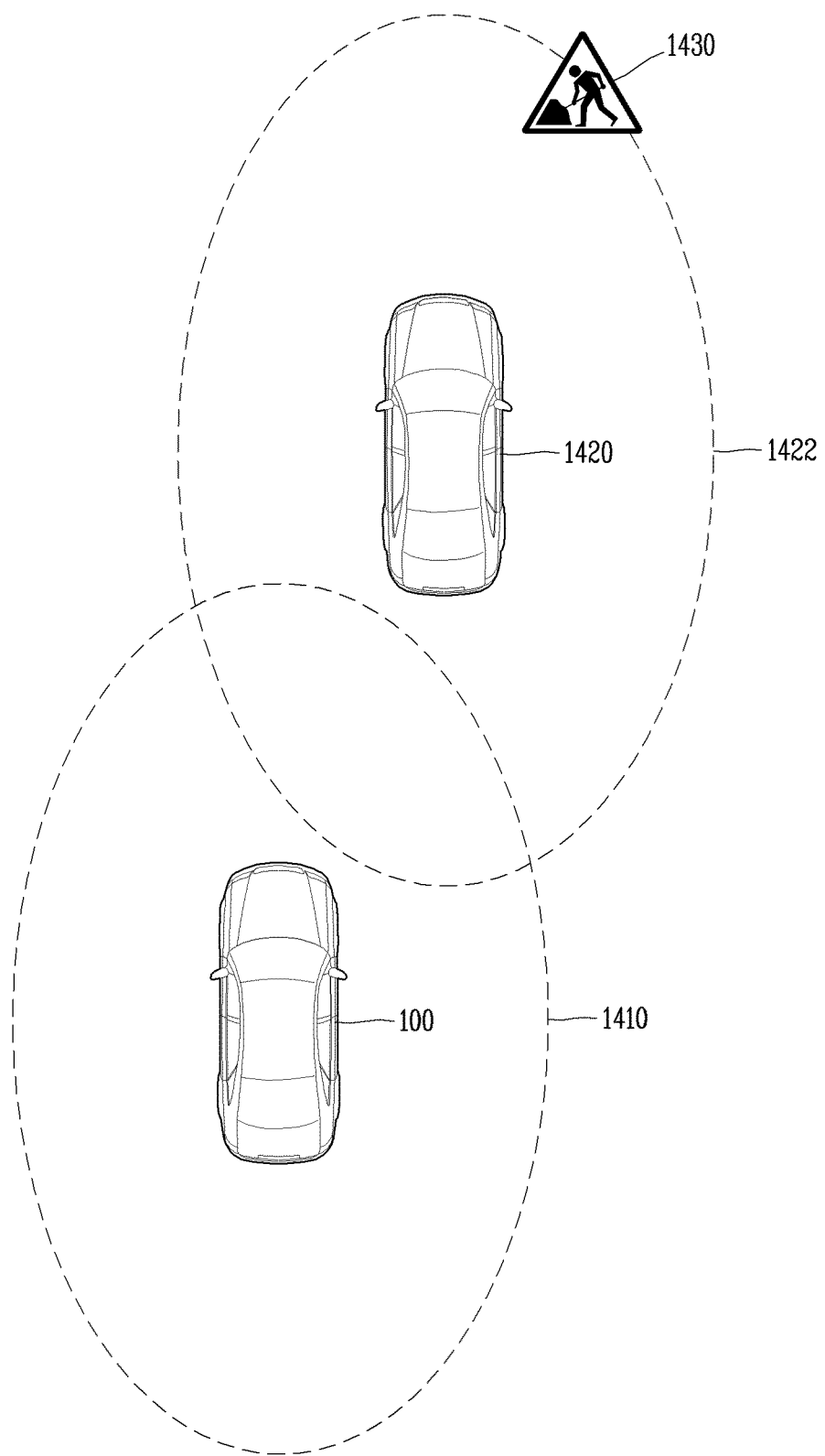
FIG. 14 is a diagram illustrating an example method for selectively using external information received from an external device.

FIG. 14 is a diagram illustrating an example method for selectively using external information received from an external device.

As illustrated in FIG. 14, the vehicle 100 and another vehicle 1420 are traveling in the same direction. A first range 1410 available for electric components mounted on the vehicle 100 to generate dynamic information and a second range 1422 allowable for electric components mounted on the another vehicle 1420 to generate dynamic information are illustrated in FIG. 14.

When the another vehicle 1420 detects a road construction ahead sign 1430, the another vehicle 1420 may generate external information regarding the road construction ahead sign 1430 and transmit it to the vehicle 100 through V2X communication. The path providing device 800 that provides a route to the vehicle 100 may generate dynamic information regarding the road construction ahead sign 1430 based on the external information and add (or match) the dynamic information to forward path information.

The electric components mounted on the vehicle 100 may receive the road construction ahead sign 1430 located out of the first range 1410 from the path providing device 800, so as to be prepared for the road construction ahead sign 1430 to appear. This may allow the vehicle 100 and/or the electric components mounted on the vehicle 100 to "see" (detect) farther than they may see (detect), and relevant functions to be prepared before the vehicle 100 enters a detectable range. For example, the vehicle 100 may adjust a level of autonomous driving, adjust sensitivity of a sensor, adjust its speed, or change its destination before entering the detectable range.

The processor 830 does not generate the dynamic information when an object provided by the external information is irrelevant to the driving path of the vehicle 100, namely, located out of a reference range with respect to the vehicle 100. This is to reduce resource waste by preventing unnecessary dynamic information from being generated.

Figure 15:
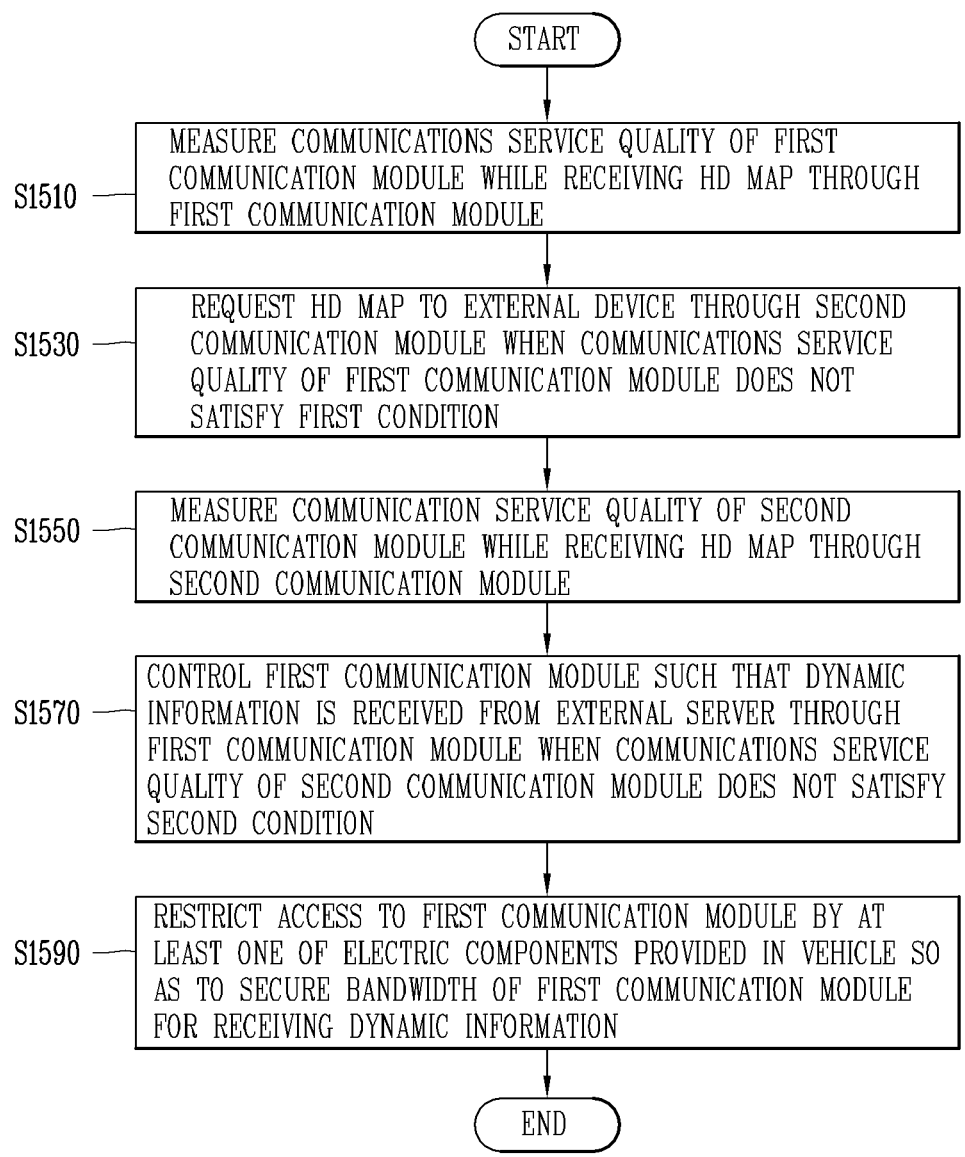
FIG. 15 is a flowchart illustrating an example method for receiving dynamic information by selectively using first and second communication modules.

FIG. 15 is a flowchart illustrating an example method for receiving dynamic information by selectively using first and second communication modules.

When communications service quality of the first communication module 812 and communications service quality of the second communication module 814 are both good, the processor 830 receives a HD map through the first communication module 812, and generates dynamic information by receiving external information through the second communication module 814. When the external information is not received, dynamic information may be generated using the HD map. This is advantageous in that real-time information on the road is reflected by external information, and telematics networks are less used, thereby reducing costs.

However, there may be a situation where communication with the telematics communication device 910 like an external server is difficult or unavailable due to unstable communication through the first communication module 812. For example, a communications failure may occur due to entering a poor communications environment such as a tunnel, or malfunctioning or broken base station.

The processor 830 calculates (or measures) communications service quality of the first communication module 812 while receiving the HD map through the first communication module 812 (S1510).

For example, the processor 830 may measure a quality of communications service between the first communication module 812 and the telematics communication device 910.

The communications service quality may include at least one of transmission quality, connection quality, and reliability. Here, the transmission quality refers to an error rate of a transmission signal. The connection quality, which is a measure of access to networks without an unreasonable delay, refers to a probability of call loss or connection latency. As for the reliability, its value may be calculated stochastically by an annual failure rate of each part of network.

The communications service quality may vary based on implementations. However, in the present disclosure, it is calculated based on at least one of latency and a bandwidth.

Next, when the communications service quality of the first communication module 812 does not satisfy a first condition, the processor 830 request a HD map to the external device through the second communication module 814 (S1530).

In a situation where it is difficult to receive the HD map through the first communication module 812, the processor 830 requests an HD map to the external device through the second communication module 814. The external device refers to the V2X communication device 930. As V2X communication plays a role of telematics communication, an HD map may be stably received.

Next, the communications service quality of the second communication module 814 is calculated while receiving the HD map through the second communication module 814 (S1550).

The processor 830 may measure communications service quality between the second communication module 814 and the external device. When many vehicles nearby try to access to V2X communication at the same time, a real-time V2X communication problem may occur. Or, the V2X communication may not be stable due to a temporary cause. In this case, it is important to ensure smooth operation of the V2X communication, which is a communication equipment related to safety.

Next, when the communications service quality of the second communication module 814 does not satisfy a second condition, the processor 830 controls the first communication module 812 such that the dynamic information is transmitted from the external server through the first communication module 812 (S1570).

The processor 830 may the dynamic information. In some examples, the processor 830 may also receive an HD map through the first communication module 812.

Next, in order to secure a bandwidth of the first communication module 812 for receiving the dynamic information, the processor 830 restricts using (or access to) the first communication module 812 by at least one of electric components provided in the vehicle 100 (S1590).

This is to enable the first communication module 812 to secure the bandwidth for receiving the dynamic information. For example, 50% of the bandwidth of the first communication module 812 may be used for infotainment of a given application, and the remaining 50% may be used to receive dynamic information. At this time, the bandwidth usage may be limited such that 20% of the bandwidth of the first communication module 812 is used for the given application, and the remaining 80% is used for receiving the dynamic information, thereby securing the bandwidth for receiving the dynamic information.

Figure 16:
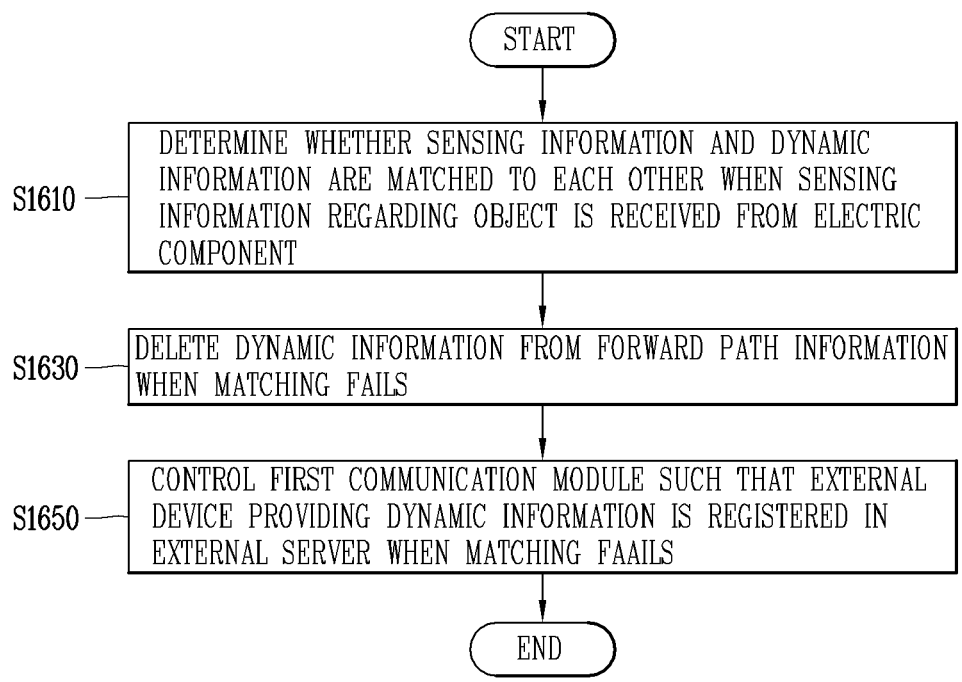
FIG. 16 is a flowchart illustrating an example method for determining validity of dynamic information by using information received from electric components mounted on a vehicle.

FIG. 16 is a flowchart illustrating an example method for determining validity of dynamic information by using information received from electric components mounted on a vehicle.

There is a concern about a possibility of hacking that has a detrimental effect on the vehicle 100. For example, false information about an object, which is a non-existent and processed object, on a lane on which the vehicle 100 travels may be received through the second communication module 814.

When sensing information regarding an object is received from an electric component, the processor 830 determines whether the sensing information and the dynamic information are matched to each other. (S1610).

A position, size, shape, and type of the object may be determined to be matched. If they are not matched, an inconsistency (discrepancy) rate (or consistency (match) rate) may be calculated. When the calculated inconsistency rate is higher than a reference, the processor 830 may determine that the sensing information and the dynamic information are not matched. When no object corresponding to the dynamic information is sensed, it is also determined that matching is failed.

Next, when matching fails, the dynamic information may be deleted from the forward path information (S1630). Further, the processor 830 may control the second communication module 814 such that the external information is not transmitted from the external device.

Then, when matching fails, the processor 830 may control the first communication module 812 such that the external device providing the dynamic information is registered in an external server (S1650).

The external device may be backlisted by the external server, so that external information transmitted from the external device is not used.

Accordingly, the path providing device 800 may not malfunction due to non-existent false information, and an external device providing the false information may be blacklisted.

The processor 830 may check validity of the external device providing the external information through the external server. For example, when the external device is on the blacklist, generation of the dynamic information based on the external information is suppressed. In contrast, when the external device is valid as it is not included in the blacklist, the dynamic information based on the external information may be generated.

The present disclosure may be implemented as computer-readable codes (applications or software) in a program-recorded medium. The method of controlling the autonomous vehicle may be realized by a code stored in a memory or the like.

The computer-readable medium may include all types of recording devices each storing data readable by a computer system. Examples of such computer-readable media may include a hard disk drive (HDD), solid state disk (SSD), silicon disk drive (SDD), read-only memory (ROM), random access memory (RAM), compact disc (CD-ROM), magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A path providing device configured to provide a route to a vehicle, the device comprising:
a first communicator configured to receive a high-definition (HD) map information from a server;
a second communicator configured to receive external information generated by an external device; and
a processor configured to:

generate forward path information for guiding the vehicle to a road ahead of the vehicle based on the HD map information, provide the forward path information to at least one of components configured to sense vehicle driving information and including one or more sensors in the vehicle, generate dynamic information related to an object to be sensed by the at least one of the components configured to sense the vehicle driving information based on at least one of the external information and the HD map information, the dynamic information being object information for guiding a predetermined object that disturbs driving in a corresponding lane among objects that are driven on the road, and match the dynamic information to the forward path information, wherein the processor is further configured to:
determine a relative speed with each of external devices, and
classify, based on the relative speed with each of the external devices, each of the external devices into a first group or a second group, and wherein first external information received from a first external device included in the first group is used to generate the dynamic information, and second external information received from a second external device included in the second group is not used to generate the dynamic information.

2. The device of claim 1, wherein the dynamic information comprises one of first dynamic information and second dynamic information that is different from the first dynamic information, and wherein the processor is configured to:
search for a third external device located within a predetermined range;
generate the first dynamic information based on a presence of the third external device within the predetermined range; and
generate the second dynamic information based on an absence of the third external device within the predetermined range.

3. The device of claim 2, wherein the processor is configured to:
based on the third external device being present within the predetermined range, generate the first dynamic information based on the external information received through the second communicator; and
based on the third external device not being present within the predetermined range, generate the second dynamic information based on the HD map information received through the first communicator.

4. The device of claim 3, wherein the processor is configured to:
based on the third external device being present within the predetermined range, control the second communicator to restrict transmission of the external information from the server through the second communicator.

5. The device of claim 2, wherein the processor is configured to:
based on the third external device corresponding to another vehicle, generate an autonomous driving command for maintaining a predetermined distance between the vehicle and the another vehicle.

6. The device of claim 1, wherein the processor is configured to:

generate the dynamic information based on the object being located within a reference range with respect to the vehicle; and
restrict generation of the dynamic information based on the object being located out of the reference range.

7. The device of claim 1, wherein the processor is configured to:
determine a first communications service quality of the first communicator; and
transmit a request for the HD map information to the external device through the second communicator based on the first communications service quality not satisfying a first condition.

8. The device of claim 7, wherein the processor is configured to:
determine a second communications service quality of the second communicator; and
control the first communicator to receive the external information from the server based on the second communications service quality not satisfying a second condition.

9. The device of claim 1, wherein the processor is configured to:
receive sensing information from at least one of the components configured to sense the vehicle driving information;
based on sensing information regarding the object being received from the at least one of the components configured to sense vehicle driving information, determine whether the sensing information and the dynamic information match each other; and
delete the dynamic information from the forward path information based on a determination that the sensing information and the dynamic information do not match each other.

10. The device of claim 9, wherein the processor is configured to:
based on the determination that the sensing information and the dynamic information do not match each other, control the second communicator to restrict transmission of the external information from the external device.

11. The device of claim 10, wherein the processor is configured to:
based on the determination that the sensing information and the dynamic information do not match each other, control the first communicator to register the external device in the server.

12. A path providing method for providing a route to a vehicle, the method comprising:
receiving a high-definition (HD) map information from a server;
generating forward path information for guiding the vehicle to a road ahead of the vehicle based on the HD map information;
providing the forward path information to at least one of components configured to sense vehicle driving information and including one or more sensors in the vehicle;
receiving external information generated by an external device;
generating dynamic information regarding an object to be sensed by the at least one of the components configured to sense vehicle driving information based on at least one of the external information and the HD map information, the dynamic information being object information for guiding a predetermined object that disturbs driving in a corresponding lane among objects that are driven on the road;

matching the dynamic information to the forward path information;

determining a relative speed with each of external devices; and classifying, based on the relative speed with each of the external devices, each of the external devices into a first group or a second group, wherein external information received from an external device included in the first group is used to generate the dynamic information, and external information received from an external device included in the second group is not used to generate the dynamic information.

13. The method of claim 12, wherein the dynamic information comprises one of first dynamic information and second dynamic information that is different from the first dynamic information, and wherein generating the dynamic information comprises:

searching for a third external device located within a predetermined range;

generating the first dynamic information based on a presence of the third external device within the predetermined range; and generating the second dynamic information based on an absence of the third external device within the predetermined range.

14. The method of claim 13, wherein generating the dynamic information comprises:

based on the third external device being present within the predetermined range, generating the first dynamic information based on the external information; and based on the third external device not being present within the predetermined range, generating the second dynamic information based on the HD map information.

15. The method of claim 13, further comprising:

based on the third external device corresponding to another vehicle, generating an autonomous driving command for maintaining a predetermined distance between the vehicle and the another vehicle.

16. The method of claim 12, wherein generating the dynamic information comprises:

generating the dynamic information based on the object being located within a reference range with respect to a traveling path of the vehicle; and restricting generation of the dynamic information based on the object being located out of the reference range.

17. The method of claim 12, wherein the HD map information is received through a first communicator, and the external information is received through a second communicator, and wherein the method further comprises:

determining a first communications service quality of the first communicator while receiving the HD map information through the first communicator, transmitting a request for the HD map information to the external device through the second communicator based on the first communications service quality not satisfying a first condition, determining a second communications service quality of the second communicator while receiving the external information through the second communicator, controlling the first communicator to receive the external information from the server based on the second communications service quality not satisfying a second condition.

18. The method of claim 12, further comprising:

receiving sensing information from at least one of the components configured sense the vehicle driving information;

based on the sensing information regarding the object being received from the at least one of the components configured to sense vehicle driving information, determining whether the sensing information and the dynamic information match each other; and deleting the dynamic information from the forward path information based on a determination that the sensing information and the dynamic information do not match each other.

* * * * *